United States Patent
Laroia et al.

(10) Patent No.: US 9,277,470 B2
(45) Date of Patent: *Mar. 1, 2016

(54) METHOD OF CREATING AND UTILIZING DIVERSITY IN A MULTIPLE CARRIER COMMUNICATION SYSTEM

(71) Applicant: QUALCOMM Incorporated, San Diego, CA (US)

(72) Inventors: Rajiv Laroia, Far Hills, NJ (US); Junyi Li, Chester, NJ (US); Sathyadev Venkata Uppala, Whitehouse Station, NJ (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/764,230

(22) Filed: Feb. 11, 2013

(65) Prior Publication Data
US 2013/0150055 A1    Jun. 13, 2013

Related U.S. Application Data

(60) Continuation of application No. 12/060,249, filed on Mar. 31, 2008, now Pat. No. 8,374,613, which is a division of application No. 10/636,516, filed on Aug. 7, 2003, now Pat. No. 7,363,039, which is a
(Continued)

(51) Int. Cl.
*H04W 36/20* (2009.01)
*H04W 16/12* (2009.01)
(Continued)

(52) U.S. Cl.
CPC .............. *H04W 36/20* (2013.01); *H04W 16/12* (2013.01); *H04W 16/14* (2013.01);
(Continued)

(58) Field of Classification Search
None
See application file for complete search history.

(56) References Cited

U.S. PATENT DOCUMENTS

| | | |
|---|---|---|
| 4,679,244 A | 7/1987 | Kawasaki et al. |
| 4,833,701 A | 5/1989 | Comroe et al. |

(Continued)

FOREIGN PATENT DOCUMENTS

| | | |
|---|---|---|
| CA | 2442400 A1 | 11/2002 |
| CN | 1276954 A | 12/2000 |

(Continued)

OTHER PUBLICATIONS

Co-pending U.S. Appl. No. 08/144,901, filed Oct. 28, 1993.
(Continued)

*Primary Examiner* — Kouroush Mohebbi
(74) *Attorney, Agent, or Firm* — Jimmy Cheng

(57) ABSTRACT

In many cellular systems, reusing spectrum bandwidth, creates problems in boundary regions between the cells and sectors where the signal strength received from adjacent base stations or adjacent sector transmissions of a single base station may be nearly equivalent. The invention creates a new type of diversity, referred to as multiple carrier diversity by utilizing multiple carriers, assigning different power levels to each carrier frequency at each base station, and/or offsetting sector antennas. The cell and/or sector coverage areas can be set so as to minimize or eliminate overlap between cell and/or sector boundary regions of different carrier frequencies. Mobile nodes traveling throughout the system can exploit multiple carrier diversity by detecting carriers and selecting to use a non-boundary carrier based on other system criteria in order to improve performance. Boundary carriers may, but need not be, identified and excluded from consideration for use by a wireless terminal.

26 Claims, 11 Drawing Sheets

Related U.S. Application Data continuation-in-part of application No. 10/324,194, filed on Dec. 20, 2002, now Pat. No. 6,788,963.

(60) Provisional application No. 60/401,920, filed on Aug. 8, 2002.

(51) Int. Cl.

| | | |
|---|---|---|
| *H04W 16/14* | (2009.01) | |
| *H04W 52/02* | (2009.01) | |
| *H04W 52/60* | (2009.01) | |
| *H04W 72/04* | (2009.01) | |
| *H04W 24/00* | (2009.01) | |
| *H04W 36/06* | (2009.01) | |
| *H04W 52/08* | (2009.01) | |
| *H04W 52/28* | (2009.01) | |
| *H04W 56/00* | (2009.01) | |
| *H04W 68/02* | (2009.01) | |
| *H04W 72/00* | (2009.01) | |

(52) U.S. Cl.
CPC ......... *H04W 52/0235* (2013.01); *H04W 52/60* (2013.01); *H04W 72/048* (2013.01); *H04W 24/00* (2013.01); *H04W 36/06* (2013.01); *H04W 52/08* (2013.01); *H04W 52/281* (2013.01); *H04W 52/283* (2013.01); *H04W 52/286* (2013.01); *H04W 52/287* (2013.01); *H04W 52/288* (2013.01); *H04W 56/00* (2013.01); *H04W 68/02* (2013.01); *H04W 68/025* (2013.01); *H04W 72/00* (2013.01); *Y02B 60/50* (2013.01)

(56) References Cited

U.S. PATENT DOCUMENTS

| | | | |
|---|---|---|---|
| 4,901,307 A | 2/1990 | Gilhousen et al. | |
| 5,056,109 A | 10/1991 | Gilhousen et al. | |
| 5,095,529 A | 3/1992 | Comroe et al. | |
| 5,128,938 A | 7/1992 | Borras | |
| 5,267,261 A | 11/1993 | Blakeney, II et al. | |
| 5,311,543 A | 5/1994 | Schreiber | |
| 5,325,432 A | 6/1994 | Gardeck et al. | |
| 5,369,781 A | 11/1994 | Comroe et al. | |
| 5,387,905 A | 2/1995 | Grube et al. | |
| 5,420,909 A | 5/1995 | Ng et al. | |
| 5,450,405 A | 9/1995 | Maher et al. | |
| 5,461,645 A | 10/1995 | Ishii | |
| 5,463,617 A | 10/1995 | Grube et al. | |
| 5,465,391 A | 11/1995 | Toyryla | |
| 5,473,605 A | 12/1995 | Grube et al. | |
| 5,491,835 A | 2/1996 | Sasuta et al. | |
| 5,511,232 A | 4/1996 | O'dea et al. | |
| 5,513,381 A | 4/1996 | Sasuta | |
| 5,542,108 A | 7/1996 | Sasuta | |
| 5,566,366 A | 10/1996 | Russo et al. | |
| 5,590,396 A | 12/1996 | Henry | |
| 5,594,948 A | 1/1997 | Talarmo et al. | |
| 5,610,559 A | 3/1997 | Dent | |
| 5,623,511 A | 4/1997 | Bar-David et al. | |
| 5,625,882 A | 4/1997 | Vook et al. | |
| 5,627,882 A | 5/1997 | Chien et al. | |
| 5,634,197 A | 5/1997 | Paavonen | |
| 5,710,982 A | 1/1998 | Laborde et al. | |
| 5,720,455 A | 2/1998 | Kull et al. | |
| 5,771,224 A | 6/1998 | Seki et al. | |
| 5,809,401 A | 9/1998 | Meidan et al. | |
| 5,809,419 A | 9/1998 | Schellinger et al. | |
| 5,815,531 A | 9/1998 | Dent | |
| 5,831,479 A | 11/1998 | Leffel et al. | |
| 5,844,894 A * | 12/1998 | Dent | 370/330 |
| 5,867,060 A | 2/1999 | Burkett, Jr. et al. | |
| 5,884,196 A | 3/1999 | Lekven et al. | |
| 5,923,651 A | 7/1999 | Struhsaker | |
| 5,982,760 A | 11/1999 | Chen | |
| 5,991,635 A | 11/1999 | Dent et al. | |
| 5,999,818 A | 12/1999 | Gilbert et al. | |
| 6,021,123 A | 2/2000 | Mimura | |
| 6,078,815 A * | 6/2000 | Edwards | 455/450 |
| 6,108,542 A | 8/2000 | Swanchara et al. | |
| 6,108,560 A | 8/2000 | Navaro et al. | |
| 6,125,148 A | 9/2000 | Frodigh et al. | |
| 6,125,150 A | 9/2000 | Wesel et al. | |
| 6,160,791 A | 12/2000 | Bohnke | |
| 6,167,270 A | 12/2000 | Rezaiifar et al. | |
| 6,185,259 B1 | 2/2001 | Dent | |
| 6,201,785 B1 | 3/2001 | Fouche et al. | |
| 6,222,851 B1 | 4/2001 | Petry | |
| 6,226,280 B1 | 5/2001 | Roark et al. | |
| 6,230,022 B1 | 5/2001 | Sakoda et al. | |
| 6,239,690 B1 | 5/2001 | Burbidge et al. | |
| 6,243,584 B1 | 6/2001 | O'byrne | |
| 6,259,685 B1 | 7/2001 | Rinne et al. | |
| 6,266,529 B1 | 7/2001 | Chheda | |
| 6,275,712 B1 | 8/2001 | Gray et al. | |
| 6,307,849 B1 | 10/2001 | Tiedemann, Jr. | |
| 6,308,080 B1 | 10/2001 | Burt et al. | |
| 6,321,095 B1 | 11/2001 | Gavette | |
| 6,334,047 B1 | 12/2001 | Andersson et al. | |
| 6,347,081 B1 | 2/2002 | Bruhn | |
| 6,377,803 B1 | 4/2002 | Ruohonen | |
| 6,385,261 B1 | 5/2002 | Tsuji et al. | |
| 6,396,803 B2 | 5/2002 | Hornsby et al. | |
| 6,400,703 B1 | 6/2002 | Park et al. | |
| 6,408,038 B1 | 6/2002 | Takeuchi | |
| 6,424,678 B1 | 7/2002 | Doberstein et al. | |
| 6,442,152 B1 | 8/2002 | Park et al. | |
| 6,456,604 B1 | 9/2002 | Lee et al. | |
| 6,456,627 B1 | 9/2002 | Frodigh et al. | |
| 6,470,030 B1 | 10/2002 | Park et al. | |
| 6,473,624 B1 | 10/2002 | Corbett et al. | |
| 6,496,543 B1 | 12/2002 | Zehavi | |
| 6,498,934 B1 | 12/2002 | Muller | |
| 6,538,985 B1 | 3/2003 | Petry et al. | |
| 6,546,252 B1 | 4/2003 | Jetzek et al. | |
| 6,553,019 B1 | 4/2003 | Laroia et al. | |
| 6,563,881 B1 | 5/2003 | Sakoda et al. | |
| 6,574,211 B2 | 6/2003 | Padovani et al. | |
| 6,587,510 B1 | 7/2003 | Minami et al. | |
| 6,609,008 B1 | 8/2003 | Whang et al. | |
| 6,611,506 B1 | 8/2003 | Huang et al. | |
| 6,657,988 B2 | 12/2003 | Toskala et al. | |
| 6,661,771 B1 | 12/2003 | Cupo et al. | |
| 6,690,936 B1 | 2/2004 | Lundh | |
| 6,694,147 B1 | 2/2004 | Viswanath et al. | |
| 6,721,267 B2 | 4/2004 | Hiben et al. | |
| 6,721,289 B1 | 4/2004 | O'toole et al. | |
| 6,731,939 B1 | 5/2004 | Watanabe et al. | |
| 6,765,893 B1 | 7/2004 | Bayley | |
| 6,788,963 B2 | 9/2004 | Laroia et al. | |
| 6,799,038 B2 | 9/2004 | Gopikanth | |
| 6,801,759 B1 | 10/2004 | Saifuddin | |
| 6,804,521 B2 | 10/2004 | Tong et al. | |
| 6,904,283 B2 | 6/2005 | Li et al. | |
| 6,952,454 B1 | 10/2005 | Jalali et al. | |
| 6,961,569 B2 | 11/2005 | Raghuram et al. | |
| 6,961,582 B2 | 11/2005 | Su et al. | |
| 6,961,595 B2 | 11/2005 | Laroia et al. | |
| 6,967,937 B1 | 11/2005 | Gormley | |
| 6,978,149 B1 | 12/2005 | Morelli et al. | |
| 6,999,799 B1 | 2/2006 | Almassy | |
| 7,029,511 B2 | 4/2006 | Ichikawa et al. | |
| 7,054,296 B1 | 5/2006 | Sorrells et al. | |
| 7,069,319 B2 | 6/2006 | Zellner et al. | |
| 7,085,595 B2 | 8/2006 | Kitchin | |
| 7,098,821 B2 | 8/2006 | Husted et al. | |
| 7,123,662 B2 | 10/2006 | Li et al. | |
| 7,142,864 B2 | 11/2006 | Laroia et al. | |
| 7,143,299 B1 | 11/2006 | Rubinstein et al. | |
| 7,158,804 B2 | 1/2007 | Kumaran et al. | |
| 7,162,265 B2 | 1/2007 | Ormson et al. | |
| 7,203,158 B2 | 4/2007 | Oshima et al. | |

(56) References Cited

U.S. PATENT DOCUMENTS

| | | |
|---|---|---|
| 7,209,524 B2 | 4/2007 | Chen |
| 7,218,948 B2 | 5/2007 | Laroia et al. |
| 7,257,103 B2 | 8/2007 | Yeh et al. |
| 7,269,145 B2 | 9/2007 | Koo et al. |
| 7,277,498 B2 | 10/2007 | Hanaoka et al. |
| 7,295,840 B2 | 11/2007 | Ormson |
| 7,302,227 B2 | 11/2007 | Sakoda |
| 7,317,750 B2 | 1/2008 | Shattil |
| 7,318,185 B2 | 1/2008 | Khandani et al. |
| 7,321,569 B2 | 1/2008 | Takagi et al. |
| 7,356,103 B2 | 4/2008 | Nishikawa |
| 7,362,736 B2 | 4/2008 | Suzuki |
| 7,363,039 B2 | 4/2008 | Laroia et al. |
| 7,391,819 B1 | 6/2008 | Von Der Embse |
| 7,398,111 B2 | 7/2008 | Laroia et al. |
| 7,403,472 B2 | 7/2008 | Okada et al. |
| 7,411,895 B2 | 8/2008 | Laroia et al. |
| 7,420,939 B2 | 9/2008 | Laroia et al. |
| 7,450,926 B2 | 11/2008 | Chang et al. |
| 7,480,234 B1 | 1/2009 | Hart et al. |
| 7,512,424 B2 | 3/2009 | Hossain et al. |
| 7,522,553 B2 | 4/2009 | Kang et al. |
| 7,522,672 B2 | 4/2009 | Saed |
| 7,542,437 B1 | 6/2009 | Redi et al. |
| 7,558,572 B2 | 7/2009 | Anigstein |
| 7,587,001 B2 | 9/2009 | Hazani et al. |
| 7,620,021 B1 | 11/2009 | Chen et al. |
| 7,620,395 B2 | 11/2009 | Yamashita et al. |
| 7,627,770 B2 | 12/2009 | Jones |
| 7,652,978 B2 | 1/2010 | Kim et al. |
| 7,653,035 B2 | 1/2010 | Lin et al. |
| 7,668,573 B2 | 2/2010 | Laroia et al. |
| 7,706,456 B2 | 4/2010 | Laroia et al. |
| 7,720,112 B2 | 5/2010 | Morris |
| 7,746,896 B2 | 6/2010 | Venkatachalam |
| 7,778,643 B2 | 8/2010 | Laroia et al. |
| 7,817,996 B2 | 10/2010 | Brunner |
| 7,925,291 B2 | 4/2011 | Anigstein et al. |
| 8,094,595 B2 | 1/2012 | Montojo et al. |
| 8,099,099 B2 | 1/2012 | Laroia et al. |
| 8,190,163 B2 | 5/2012 | Laroia et al. |
| 8,315,662 B2 | 11/2012 | Anigstein et al. |
| 8,374,613 B2 | 2/2013 | Laroia et al. |
| 2001/0031639 A1 | 10/2001 | Makipaa |
| 2002/0012334 A1 | 1/2002 | Strawczynski et al. |
| 2002/0077152 A1 | 6/2002 | Johnson et al. |
| 2002/0090942 A1 | 7/2002 | Karabinis et al. |
| 2002/0136157 A1 | 9/2002 | Takaoka et al. |
| 2002/0145985 A1 | 10/2002 | Love et al. |
| 2002/0172165 A1 | 11/2002 | Rosen et al. |
| 2003/0037033 A1 | 2/2003 | Nyman et al. |
| 2003/0053524 A1 | 3/2003 | Dent |
| 2003/0086379 A1 | 5/2003 | Terry et al. |
| 2003/0086381 A1 | 5/2003 | Terry et al. |
| 2003/0090993 A1 | 5/2003 | Sato |
| 2003/0148785 A1 | 8/2003 | Mangal et al. |
| 2003/0152059 A1 | 8/2003 | Odman |
| 2003/0189997 A1 | 10/2003 | Shanbhag et al. |
| 2003/0232619 A1 | 12/2003 | Fraser |
| 2003/0232631 A1 | 12/2003 | Ohmori |
| 2004/0005904 A1 | 1/2004 | Wolf et al. |
| 2004/0062274 A1 | 4/2004 | Hakansson et al. |
| 2004/0097231 A1 | 5/2004 | Marque-Pucheu |
| 2004/0100897 A1 | 5/2004 | Shattil |
| 2004/0116110 A1 | 6/2004 | Amerga et al. |
| 2004/0184567 A1 | 9/2004 | McDonough et al. |
| 2004/0189603 A1 | 9/2004 | Arrigo et al. |
| 2004/0203727 A1 | 10/2004 | Abiri et al. |
| 2004/0203838 A1 | 10/2004 | Joshi et al. |
| 2004/0219925 A1 | 11/2004 | Ahya et al. |
| 2004/0224684 A1 | 11/2004 | Dorsey et al. |
| 2004/0229625 A1 | 11/2004 | Laroia et al. |
| 2005/0002326 A1 | 1/2005 | Ling et al. |
| 2005/0002461 A1 | 1/2005 | Giannakis et al. |
| 2005/0002463 A1 | 1/2005 | Sakamoto |
| 2005/0018784 A1 | 1/2005 | Kurobe et al. |
| 2005/0047357 A1 | 3/2005 | Benveniste |
| 2005/0049013 A1 | 3/2005 | Chang et al. |
| 2005/0054302 A1 | 3/2005 | Hanaoka et al. |
| 2005/0058089 A1 | 3/2005 | Vijayan et al. |
| 2005/0058115 A1 | 3/2005 | Levin et al. |
| 2005/0105593 A1 | 5/2005 | Dateki et al. |
| 2005/0118981 A1 | 6/2005 | Laroia et al. |
| 2005/0136960 A1 | 6/2005 | Timus et al. |
| 2005/0153751 A1 | 7/2005 | Bultan et al. |
| 2005/0176436 A1 | 8/2005 | Mantravadi et al. |
| 2005/0181799 A1 | 8/2005 | Laroia et al. |
| 2005/0233710 A1 | 10/2005 | Lakkis et al. |
| 2006/0023666 A1 | 2/2006 | Jalali et al. |
| 2006/0080344 A1 | 4/2006 | McKibben et al. |
| 2006/0087993 A1 | 4/2006 | Sengupta et al. |
| 2006/0093067 A1 | 5/2006 | Jalali et al. |
| 2006/0114813 A1 | 6/2006 | Seki et al. |
| 2006/0172747 A1 | 8/2006 | Mohammed |
| 2006/0194577 A1 | 8/2006 | Su |
| 2006/0203713 A1 | 9/2006 | Laroia et al. |
| 2006/0246840 A1 | 11/2006 | Borowski et al. |
| 2006/0262739 A1 | 11/2006 | Ramirez et al. |
| 2006/0269005 A1 | 11/2006 | Laroia et al. |
| 2007/0025283 A1 | 2/2007 | Koslov |
| 2007/0042775 A1 | 2/2007 | Umatt et al. |
| 2007/0082696 A1 | 4/2007 | Wang |
| 2007/0173202 A1 | 7/2007 | Binder et al. |
| 2007/0189259 A1 | 8/2007 | Sollenberger et al. |
| 2007/0201346 A1 | 8/2007 | Geile et al. |
| 2007/0207815 A1 | 9/2007 | Alfano et al. |
| 2007/0223365 A1 | 9/2007 | Tsfaty et al. |
| 2007/0230403 A1 | 10/2007 | Douglas et al. |
| 2007/0242764 A1 | 10/2007 | Anigstein et al. |
| 2007/0259673 A1 | 11/2007 | Willars et al. |
| 2007/0286080 A1 | 12/2007 | Kim et al. |
| 2007/0291728 A1 | 12/2007 | Dalsgaard et al. |
| 2008/0027586 A1 | 1/2008 | Hern et al. |
| 2008/0046132 A1 | 2/2008 | Dalsgaard et al. |
| 2008/0101268 A1 | 5/2008 | Sammour et al. |
| 2008/0102880 A1 | 5/2008 | Gholmieh et al. |
| 2008/0123576 A1 | 5/2008 | Son et al. |
| 2008/0130543 A1 | 6/2008 | Singh et al. |
| 2008/0165698 A1 | 7/2008 | Dalsgaard et al. |
| 2008/0212710 A1 | 9/2008 | Boehlke et al. |
| 2008/0261530 A1 | 10/2008 | Gerstenberger et al. |
| 2008/0285488 A1 | 11/2008 | Walton et al. |
| 2008/0285669 A1 | 11/2008 | Walton et al. |
| 2008/0285670 A1 | 11/2008 | Walton et al. |
| 2009/0005095 A1 | 1/2009 | Chun et al. |
| 2009/0122736 A1 | 5/2009 | Damnjanovic et al. |
| 2009/0245241 A1 | 10/2009 | Martin |
| 2009/0274084 A1 | 11/2009 | Terry et al. |
| 2009/0296662 A1 | 12/2009 | Laroia et al. |
| 2010/0027502 A1 | 2/2010 | Chen et al. |
| 2010/0029212 A1 | 2/2010 | Malladi et al. |
| 2010/0093363 A1 | 4/2010 | Malladi |
| 2010/0130220 A1 | 5/2010 | Laroia et al. |
| 2010/0182942 A1 | 7/2010 | Kim et al. |
| 2010/0234059 A1 | 9/2010 | Yang et al. |
| 2010/0262404 A1 | 10/2010 | Bertness |
| 2010/0267420 A1 | 10/2010 | Chou |
| 2011/0195697 A1 | 8/2011 | Kim et al. |
| 2013/0336186 A1 | 12/2013 | Damnjanovic |

FOREIGN PATENT DOCUMENTS

| | | |
|---|---|---|
| CN | 1277760 A | 12/2000 |
| DE | 2330263 | 1/1975 |
| EP | 0923202 | 6/1999 |
| EP | 0961515 A1 | 12/1999 |
| EP | 0986278 A1 | 3/2000 |
| EP | 1022920 A2 | 7/2000 |
| EP | 1079578 | 2/2001 |
| EP | 1361686 | 11/2003 |
| EP | 1499144 A1 | 1/2005 |
| EP | 1592176 A1 | 11/2005 |
| JP | 06511371 | 12/1994 |
| JP | 8162998 | 6/1996 |

(56) References Cited

FOREIGN PATENT DOCUMENTS

| | | |
|---|---|---|
| JP | 10112695 | 4/1998 |
| JP | 10135893 A | 5/1998 |
| JP | 10313286 | 11/1998 |
| JP | 11178050 | 7/1999 |
| JP | 11196043 A | 7/1999 |
| JP | 2001111522 | 4/2001 |
| JP | 2004023391 A | 1/2004 |
| JP | 2004153311 A | 5/2004 |
| JP | 2005260906 A | 9/2005 |
| KR | 20000011693 A | 2/2000 |
| KR | 100414932 B1 | 12/2003 |
| RU | 2122288 C1 | 11/1998 |
| RU | 2168277 | 5/2001 |
| RU | 2005102111 | 10/2005 |
| TW | 200415887 | 8/2004 |
| WO | 9626620 A1 | 8/1996 |
| WO | 9627993 A1 | 9/1996 |
| WO | 9712475 A1 | 4/1997 |
| WO | 9746038 | 12/1997 |
| WO | 9938278 | 7/1999 |
| WO | 0010353 A1 | 2/2000 |
| WO | WO-0030328 A1 | 5/2000 |
| WO | 0038457 A1 | 6/2000 |
| WO | 0054542 | 9/2000 |
| WO | 0067394 A2 | 11/2000 |
| WO | 0074292 | 12/2000 |
| WO | 0119114 A1 | 3/2001 |
| WO | 03001726 | 1/2003 |
| WO | 03065628 | 8/2003 |
| WO | 2004071020 A1 | 8/2004 |
| WO | 2004075442 | 9/2004 |
| WO | 2004098093 A1 | 11/2004 |
| WO | 2004105337 A1 | 12/2004 |
| WO | 2007025138 A2 | 3/2007 |

OTHER PUBLICATIONS

Cover, T.M. "Broadcast Channels" IEEE Transactions on Information Theory, IEEE Inc., New York, US, vol. IT-18, No. 1, Jan. 1972, pp. 2-14, XP000760860, ISSN: 0018-9448.

ETSI TS123 122 v7.3.0: Digital cellular telecommunications system (Phase 2+); Universal Mobile Telecommunications System (UMTS); Non-Access-Stratum (NAS) functions related to Mobile Station (MS) in idle mode (3GPP TS 23.122 version 7.3.0 Release 7); ETSI Standards, European Telecommunication Standards Institute, Sophia-Antipolis Cedex, FR, (Sep. 2005), XP014032445.

Goldsmith, Andrea. "Multiuser Capacity of Cellular Time-Varying Channels," Signals, Systems and Computers; 1994. 1994 Conference Record of the Twenty-Eighth Asilomar Conference in Pacific Grove, CA, USA Oct. 31-Nov. 2, 1994, Los Alamitos, CA, USA, IEEE Comput. Soc, US, vol. 1, (Oct. 31, 1994), pp. 83-88, XP010148618 ISBN: 978-0-8186-6405-2, p. 85, left-hand column.

Jianming, Zhu et al.: "Ergodic Capacities for Downlink of MC-CDMA System with Different Detection and Resource Allocation Strategies," Conference Record of the 36th Asilomar Conference on Signals, Systems, & Computers. Pacific Grove, CA, Nov. 3-6, 2002; [Asilomar Conference on Signals, Systems and Computers], New York, NY IEEE, US, vol. 2, (Nov. 3, 2002), pp. 1458-1462, XP010638439, ISBN: 978-0-7803-7576-5, p. 1461, right-hand column, paragraph 1.

Notification of Transmittal of the International Search Report and the Written Opinion of the International Searching Authority with International Search Report and Written Opinion of the International Searching Authority, pp. 1-11, dated Jul. 4, 2006, from PCT/US2006/008010.

Pradhan, S. Sandeep et al.: "Efficient Layered Video Delivery Over Multicarrier Systems Using Optimized Embedded Modulation," Image Processing, 1997. Proceedings, International Conference on Santa Barbara, CA, USA Oct. 26-29, 1997, Los Alamitos, CA, USA, IEEE Comput. Soc, US, vol. 3, (Oct. 26, 1997), pp. 452-455, XP010253736, ISBN: 978-0-8186-8183-7, p. 452, right-hand column, paragraphs 1,2 and p. 454, section 3.3.

Ericsson: "DRX and DTX in LTE Active," 3GPP Draft; R2-060967, 3rd Generation Partnership Project (3GPP), Mobile Competence Centre; 650, Route Des Lucioles; F-06921 Sophia-Antipolis Cedex; France, vol. RAN WG2. No. Athens Greece; 20060323, Mar. 23, 2006 XP050130896, pp. 1-5.

European Search Report—EP13020100—Search Authority—Munich—Nov. 29, 2013.

Nokia: "Active mode DRX details," 3GPP Draft; R2-070243, Active Mode DRX Details, 3rd Generation Partnership Project (3GPP), Mobile Competence Centre; 650, Route Des Lucioles; F-06921 Sophia-Antipolis Cedex; France, vol. RAN WG2. No. Sorrento. Italy; 20070110, Jan. 10, 2007, XP050133339, pp. 1-10.

Texas Instruments: "Contention-Free Preamble-Based Synchronized RACH: Comparison with other solutions," 3GPP Draft; R1-070260 SRACMP, 3rd Generation Partnership Project (3GPP), Mobile Competence Centre; 650. Route Des Lucioles; F-06921 Sophia-Antipolis Cedex; France vol. RAN WG1. No. Sorrento. Italy; 20070110, Jan. 10, 2007, XP050104297, pp. 9.

ZTE: "MAC state transition," 3GPP Draft; R2-060064, 3rd Generation Partnership Project (3GPP), Mobile Competence Centre; 650, Route Des Lucioles ; F-06921 Sophia-Antipolis Cedex; France, vol. RAN WG2, No. Sophia Anti polis, France; 20060105, Jan. 5, 2006, XP050130225, pp. 2.

* cited by examiner

METHOD OF CREATING AND UTILIZING DIVERSITY IN A MULTIPLE CARRIER COMMUNICATION SYSTEM

CROSS-REFERENCE TO RELATED APPLICATIONS

The present application is a continuation of pending U.S. patent application Ser. No. 12/060,249 filed Mar. 31, 2008 and entitled "METHOD OF CREATING AND UTILIZING DIVERSITY IN A MULTIPLE CARRIER COMMUNICATIONS SYSTEM" which is a divisional of granted U.S. Pat. No. 7,363,039 issued on Apr. 22, 2008 and entitled "METHOD OF CREATING AND UTILIZING DIVERSITY IN A MULTIPLE CARRIER COMMUNICATIONS SYSTEM" which claims the benefit of U.S. Provisional Patent Application Ser. No. 60/401,920 filed on Aug. 8, 2002 and entitled "METHODS AND APPARATUS FOR IMPLEMENTING MOBILE COMMUNICATIONS SYSTEM" and is a continuation-in-part of U.S. Pat. No. 6,788,963 issued on Sep. 7, 2004. Each of the preceding applications and patents are hereby expressly incorporated by reference in their entirety.

FIELD OF THE INVENTION

The present invention is directed to wireless communications systems and, more particularly, to methods and apparatus for improving communication at the cell and/or sector boundaries of a multiple carrier spread spectrum system, by creating and utilizing carrier diversity as described below.

BACKGROUND OF THE INVENTION

Wireless communications systems are frequently implemented as one or more communications cells. Each cell normally includes a base station which supports communications with end nodes, e.g., wireless terminals such as mobile nodes, that are located in, or enter, the communications range of the cell's base station. Signals transmitted between a base station and a mobile node may be transmitted in two possible directions, e.g., from the base station to the mobile node or from the mobile node to the base station. Transmission of signals from the base station to the mobile is often called a downlink. In contrast, transmission from the mobile to the base station is commonly referred to as an uplink. Communication cells are subdivided into sectors in some systems. Within a cell or a sector of a cell, the unit of communications resource is a symbol, e.g., QPSK or QAM symbol. In the case of an orthogonal frequency division multiplexed (OFDM) system a symbol may be transmitted on a frequency tone (e.g., subcarrier frequency) for one time slot. The total available communication resource, which tends to be limited, is divided into a number of such symbols (units) which can be used for communicating control and data information between a base station and one or more mobile nodes in the cell. For transmission purposes, the subcarrier frequencies are modulated on a carrier frequency. The carrier frequency and associated bandwidth encompassing the range of subcarrier frequencies may be reused in sectors and cells.

Bandwidth reuse is an important method of improving spectral efficiency in a cellular communication system. In particular, many cellular systems use special technology, such as spread spectrum technology, to allow the reuse of the same spectrum in multiple cells. This reuse of the same spectrum in multiple cells can result in operational problems at or near the cell boundaries. FIG. 1 shows a cellular system 100 utilizing the same spectrum in adjacent cells. In FIG. 1, a first cell 106 represents an area of coverage 110 in which a first base station, base station 1 102, may communicate with wireless terminals. A second cell 108 represents an area of coverage 112 in which a second base station, base station 2 104 may communicate with wireless terminals. Cells 106 and 108 are neighboring cells which share a common boundary. In cellular communications systems, there are certain boundary areas where the signal strengths, e.g., measured in terms of pilot power, received from different base stations are almost equally strong (sometimes referred to as 0 dB regions) and these areas are treated as the "boundary region" or 'boundary' between cells. In FIG. 1, the coverage area 110 for base station 1 102 and the coverage area 112 for adjacent base station 2 104 overlap and create a boundary region 114.

Consider an exemplary case, in which a wireless terminal is located in the cell boundary region 114. The wireless terminal can be fixed or mobile. When the wireless terminal is communicating with one of the base stations, e.g. base station 1 102, in the boundary region 114 the interference from the other base station, e.g. base station 2 104, may be almost as strong as the signal from the serving base station 102. Indeed, due to fading and other impairments in the wireless channel, the signal may be much weaker than the interference from time to time. Therefore, the connection for that wireless terminal may not be robust in such a case. The signal reliability in the boundary region 114 may be low and generally the power has to be boosted to overcome the noise. A weak signal with low reliability may result in loss of or disruption of communications for the user of the wireless terminal resulting in customer dissatisfaction. Many wireless terminals are mobile devices operating on limited battery resources; therefore, any additional expenditure of power required by the mobile can be very significant, as it will directly reduce the user's operational time between battery recharge or replacement. In addition, the cost to serve that wireless terminal in boundary region 114, in terms of power and bandwidth allocation in the serving base station 102, may be relatively high. Hence, there is a need for apparatus and methods to improve the service in the cell boundary region 114.

Some cellular systems using special technology, such as spread spectrum technology, also subdivide the cells into sectors and allow the reuse of the same spectrum in all the sectors. This reuse of the same spectrum in all sectors of a cell can result in operational problems at or near the sector boundaries in addition to the above discussed cell boundary problems. The sector boundary region problems encountered are very similar or identical to the cell boundary regions problems. Hence, there is also a need for apparatus and methods to improve the service in the sector boundary regions.

SUMMARY OF THE INVENTION

As discussed above, in many cellular systems, reusing spectrum bandwidth, creates problems in boundary regions between the cells and sectors where the signal strength received from adjacent base stations or from adjacent sector transmissions of a single base station may be nearly the same. In those regions, the intercell and/or intersector interference levels are relatively high which can lead to low reliability and poor quality of service. The invention uses apparatus and methods to create different cell and/or sector boundary regions for different carrier frequencies transmitted from a base station which supports the use of multiple carrier frequencies. By engineering the overall system to take advantage of the fact that different boundary regions are associated with different carrier frequencies and by supporting intracell and/or intercarrier handoff wireless terminals can be assigned to carriers in a way that minimizes or reduces the effect of boundary interference.

The invention creates a new type of diversity, referred to as multiple carrier diversity with respect to cells and/or sectors by utilizing multiple carriers. In accordance with one feature of the invention, this is accomplished, in part, by assigning different power levels to different carrier frequencies at a base station. In some exemplary embodiments there is at least a difference in power levels of 20% between two carriers used by the same base station. In other embodiments the difference in power levels may be greater or lower. For example, power differences of at least 10, 30, 40 and 50 percent may be and are used in various other embodiments.

This summary and various parts of the application describe multiple carrier diversity with respect to two exemplary carrier frequencies A and B; however, the principles are applicable to other numbers of carrier frequencies, and the invention is not limited to the exemplary two carrier embodiment. For example, 3 or more carriers may be used at a base station corresponding to a cell. In one particular exemplary embodiment, each base station transmits two carrier frequency signals each having a different carrier frequency A and B, respectively, and each carrier signal having communications bandwidth. The use of disparate power levels creates coverage areas for each carrier signal. This results in different intercell boundaries for different carrier signals transmitted by the base station. In a multiple base station system, power levels can be adjusted and controlled at a first base station so that the carrier frequency A boundary and the carrier frequency B boundary created as a result of an adjacent base station using the same carrier frequencies but different power levels are sufficiently separated to create small or no overlap in the boundary regions. The power levels for the carrier signals can be, and in some embodiments, are, chosen at the second base station so that the carrier frequency A boundary and the carrier frequency B boundary will not overlap. In one particular exemplary embodiment the difference in carrier signal power levels with regard to signals generated by a base station is at least 20%.

In various embodiments, there is a relationship between the power levels of carrier signals of adjacent base stations. For example, in some embodiments, if $P_{A1} > P_{B1}$, then $P_{A2} < P_{B2}$; if $P_{A1} < P_{B1}$, then $P_{A2} > P_{B2}$. In some embodiments $P_{A1} = P_{B2} < P_{A2} = P_{B1}$.

In some implementations the power levels are chosen, in accordance with one or more of the above carrier signal power relationships, to insure that there is less than a 50% overlap between a carrier frequency A cell boundary region and a carrier frequency B cell boundary region. In some implementations, there is no overlap between the frequency A and B cell boundary regions.

The methods and apparatus of the invention can also be used to create carrier diversity with respect to sectors, in a sectorized environment, e.g., where a single cell includes multiple sectors into which the base station transmits by using multiple antennas or antenna elements, e.g., one per sector per carrier frequency, or other techniques such as multiple antennas in combination with beam forming.

By using antennas which are offset from one another for each of multiple carriers, or other techniques to form different sector coverage areas for the sectors corresponding to different carrier frequencies, it is possible to create a coverage region where the sector boundaries for different carrier frequencies used within a cell will be different. By controlling the sector locations for different carrier frequencies, it is possible to create a cell where there is little or no overlap between boundary areas corresponding to sectors corresponding to different carrier frequencies. In such a case, when a wireless terminal is in a boundary area corresponding to one sector it is possible to switch to another carrier frequency in the cell, e.g., as part of an intercarrier handoff. Since sectors corresponding to different carriers are different, in the sectorized embodiment, an intracell intercarrier handoff is normally an intracell intersector handoff. As a wireless terminal moves in a cell, or because of different loading conditions, multiple intracell intercarrier handoffs may occur even in the case where a carrier being used to support a communication session has not degraded to the point where such a handoff is necessarily required from a communications perspective. While such handoffs may complicate processing slightly, by switching between the carriers at a particular time, power efficiency and increased overall data throughput can be achieved since the effect of intersector interference can be minimized.

In embodiments where different antennas are used for each sector of a cell, with different antennas being used for each carrier frequency, the antennas used to transmit different carrier frequencies are offset from each other to provide different coverage areas and different sector boundaries for each carrier frequency. In one such embodiment, the antennas corresponding to a first carrier frequency are offset at least 30 degrees from an antenna corresponding to a second carrier frequency. In other embodiments other offsets are used, e.g., offsets of at least 10, 20, 30, 40, or 50 degrees are used. In one particular embodiment where a cell is divided into three sectors and at least two carrier frequencies are used, the antennas corresponding to a first carrier frequency are offset from antennas corresponding to a second carrier frequency by at least 60 degrees.

In addition to methods and apparatus for creating multicarrier diversity the present invention is directed to method and apparatus for exploiting the benefits made possible from such diversity. To take advantage of such diversity, intracell carrier handoffs are implemented in cases where a carrier handoff is not necessarily necessitated by the inability to successful continue communicating using a carrier being used for a communications session but because communications and thus system efficiencies can be obtained by having a wireless terminal switch carriers. Thus, intra-cell and inter-sector inter-carrier handoffs may occur while the SNR of the carrier remains reasonably good, e.g., between 3 dB and 0 dB. Dropping below an upper predetermined threshold, e.g., a 3 dB threshold, may trigger consideration of an intercarrier handoff. The decreasing SNR combined with an SNR below 3 dB may indicate entry into a boundary region. Before a intercarrier handoff occurs while the SNR remains satisfactory, e.g., above 0 dB, the system may, and in some embodiments does, require that the SNR to remain below the upper threshold, e.g., 3 dB, for some predetermined period of time, before implementing an intra-cell intercarrier handoff. For example the SNR may be required to stay below 3 dB for 1 seconds, to reduce the potential that short noise bursts might cause an intercarrier handoff. Other periods of time are possible.

Wireless terminals traveling throughout the sectors and cells of the system can exploit the multiple carrier diversity by detecting carrier signal conditions and selecting, or having the base station select, carriers to be used at any given time to avoid the use of a particular carrier while in a cell or sector boundary corresponding to said carrier. The carrier selection process can be performed as a function of other information as well, e.g., carrier loading condition information, to provide an efficient carrier allocation scheme.

As discussed above base stations in accordance with the invention can transmit at multiple carrier frequencies. In some embodiments operating in a sectorized environment, the base stations may have sector transmitter circuitry for each sector and multi-sector antennas. In the case of multi-sector antennas, at least one transmitting element normally exists for each carrier frequency, with the transmitting elements of different carriers being offset to create different boundary regions for different carrier signals. The base stations have power management routines for controlling and maintaining the transmission power for each the carrier frequencies and setting power level differences between carrier frequencies at a given base station.

In some embodiments, the base station can determine from information, e.g., channel condition feedback information, received from the wireless terminal whether a wireless terminal is in a cell boundary area of a specific carrier frequency, whether the wireless terminal is in a sector boundary area of a specific carrier frequency, or whether the wireless terminal in a non-sector boundary area of a specific carrier. A wireless terminal can, and in various implementations does, determine if it is in a sector or cell boundary by comparing the power level of pilots corresponding to the same carrier frequency but received from different cells or sectors. The receipt of pilots corresponding to the same carrier frequency from different transmitters having the same or approximately the same power level, indicates that the wireless terminal is in a boundary region for the particular carrier frequency. Based on the measurement information, the wireless terminal may send an intercarrier handoff request to the base station. Based on the information, received from the wireless terminal and/or information the base station has detected or recorded, the base station can with its scheduler, inter-carrier handoff routine, and sector management routine allocate, when possible, the wireless terminal to a carrier which does not have a boundary region corresponding to the wireless terminal's current location. If multiple non-boundary carriers are available, the base station or wireless terminal will normally select a carrier which does not have a boundary area at the wireless terminal's current location based upon other additional factors such as traffic loading, power considerations, noise levels, etc.

The base station and/or wireless terminal can initiate and perform intra-cell inter-carrier handoffs for a wireless terminal based on cell and/or sector boundary region information, intercell channel interference information, intersector channel interference measurements, signal strength degradation, or other considerations. The intra-cell handoff performed by the base station may be initiated by a signal or request from the wireless terminal. The intra-cell handoff need not be forced by an event such as loss of carrier signal, but may be due to a proactive monitoring of available carriers by the wireless terminal, and a system decision to change carrier frequencies for some other reason such as load balancing or the anticipation of the entrance into a cell/sector boundary region, e.g., a region where intercell interference or intersector interfere causes the SNR for a carrier to be below 3 dB or some other value, e.g., 6, 5, 4, 2, 1 dB in some embodiments. As a result, a mobile may be involved in multiple intercarrier handoffs while remaining in a cell and without actually loosing the ability to communicate with a base station using a carrier to which it is assigned at any particular time. In fact, in some cases, 5 or more intracell intercarrier handoffs occur during a single communications session between a wireless terminal and a base station without the wireless terminal ever suffering sufficient carrier signal interference to necessitate changing of carriers to maintain reliable communication with the basestation.

In various embodiments, the wireless terminal, in accordance with the present invention, proactively and repeatedly monitors for carrier transmissions signal strength from base station transmissions of the various cells and sectors and switches carriers used to communicate with a base station based on the signal strength information despite signal quality on a carrier being used being sufficient (e.g., SNR being greater than 0 dB) to support continued communication at a communication rate which is being supported at, and before, the time the decision to switch carriers has to be made due to signal loss. In various embodiments the wireless terminal has multiple analog receiver chains, e.g., filter and demodulator chains, in which case one receiver remains on the carrier frequency used to communicate with the base station, while the other receiver chain is used to monitor for alternate carriers which may be used to communicate with the same base station. Alternately, the wireless terminal may include a single receiver chain including a channel filter and demodulator and therefore may be limited to receiving one carrier signal at a time. In this case, the wireless terminal may temporarily use its receiver to monitor for other carriers when not processing the carrier currently being used to communicate with a base station. In accordance with one embodiment of the present invention, the analog filter is adjustable and programmable with the ability to lock onto a particular selected carrier. This single receiver chain implementation is particularly possible and cost effective in a wireless data terminal, where the terminal can use the period of time during which no reception is needed from the current serving carrier to monitor other carriers, e.g., such as during a portion of a sleep or hold state of operation. As discussed above, in various embodiments the wireless terminal can do one or more of the following: measure one or more of the following: carrier signal strength, intercell channel interference, intersector channel interference; can differentiate between different types of interference, identify and classify carriers as cell and/or sector boundary carriers, form a list of candidate carriers, that are carriers received of acceptable strength and quality excluding the identified boundary carriers, and then select a carrier to use. The wireless terminal may feed back some or all of the information collected to the base station. The wireless terminal may make a selection of the carrier to use may be based upon other considerations other than boundary interference levels such as traffic loading, power consideration, or user priority. The selection of the carrier can result in the wireless terminal signaling a base station to initiate an inter-carrier handoff. The inter-carrier handoff may be an intra-cell intercarrier handoff resulting in a change in carrier frequencies and/or sectors with a cell at a single base station or may be an inter-cell inter-carrier handoff between different cells with different base station.

Numerous additional features and benefits of the present invention are discussed in the detailed description which follows:

DETAILED DESCRIPTION

When a large amount of bandwidth is allocated to a cellular system, the bandwidth is often divided into two or more portions, each of which has a distinct carrier deployed. The spectrum assigned to each distinct carrier deployed may or may not be adjacent. These deployments are called multiple carrier systems. In a multiple carrier system, deploying a spread spectrum technology, the bandwidth associated with each carrier may be reused in all cells.

The current invention is directed to methods and apparatus for improving the service at the cell boundaries and sector boundaries of a multiple carrier spread spectrum system, by creating and utilizing 'multiple carrier diversity' as described below.

Normally, in a communications system, the system is engineered for one carrier. If a second carrier is added, to be used by the same base station, typically, the same design parameters, e.g. power requirements, etc., are used resulting in the same coverage area for both carriers. In such a case, the two carriers will have the same general cell boundary and same cell boundary areas will occur between adjacent cells. In accordance, with a novel feature of the invention, the power between the multiple carriers is varied in a controlled and engineered manner, resulting in different cell boundaries of selected sizes for each carrier of a cell. In addition, the power applied by adjacent base stations with respect to each carrier frequency may be varied using similar reasoning in the multiple adjacent cells of the communications system. This creates different and potentially non-overlapping boundary areas for each carrier used in a cell.

Figure 1:
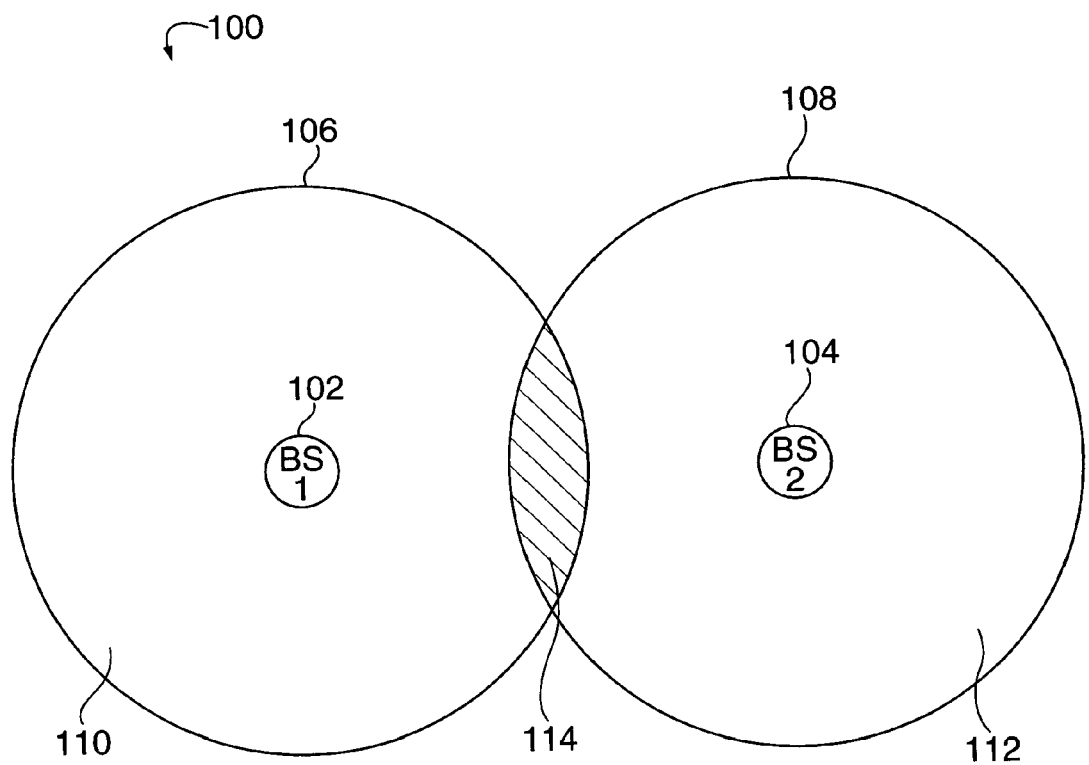
FIG. 1 illustrates two adjacent base stations with an overlapping cell boundary region.
Figure 2A:
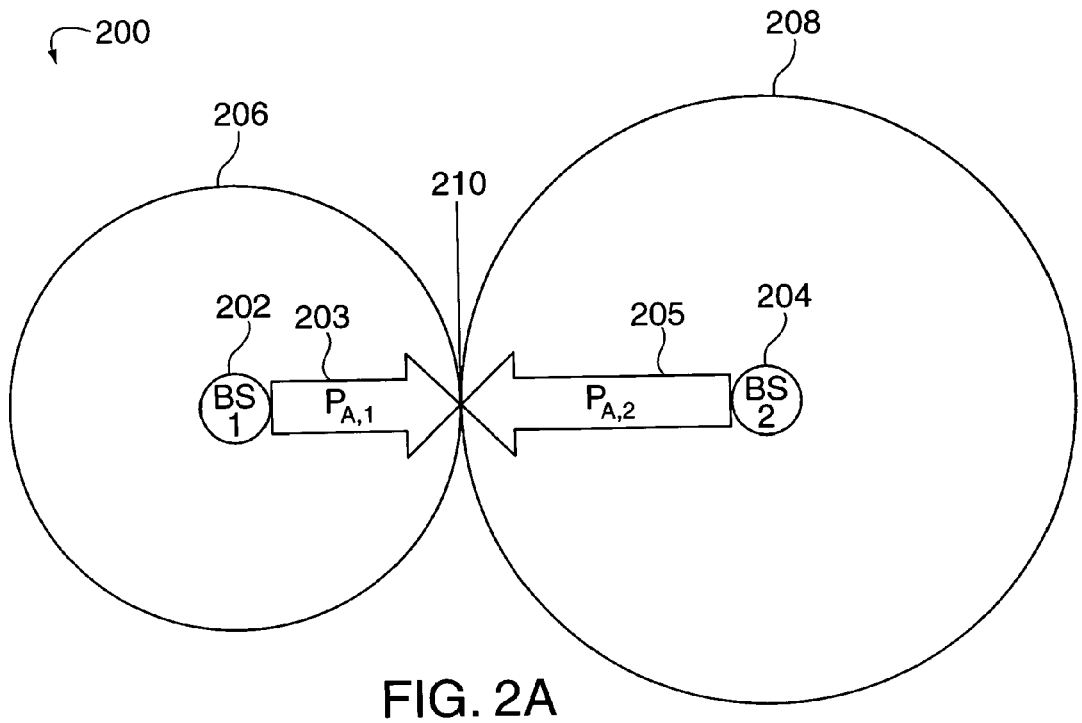
FIG. 2A illustrates two adjacent base stations operating on a first carrier frequency (A) but with different power levels for each base station implemented in accordance with the present invention.
Figure 2B:
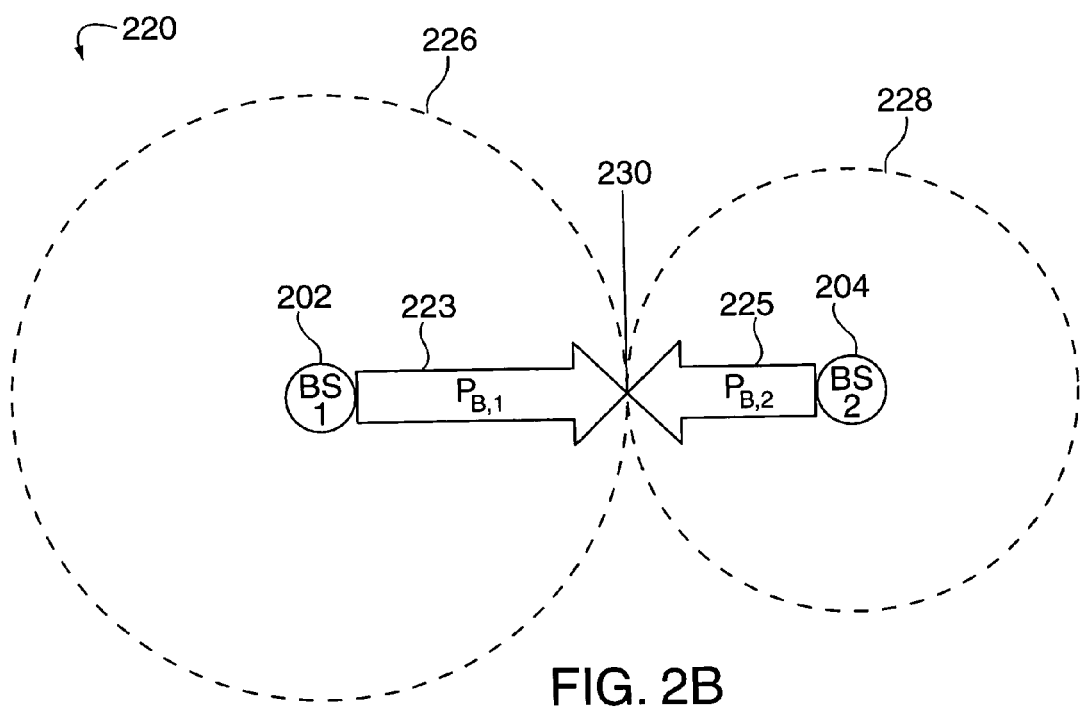
FIG. 2B illustrates the two adjacent base stations of FIG. 2A operating on a second carrier frequency (B) but with different power levels for each base station implemented in accordance with the present invention.

FIGS. 2A, 2B, 2C, and 2D are used to illustrate a method of creating multiple carrier diversity, in accordance with the invention. In FIG. 2A, an exemplary system 200 includes a first base station, base station 1 (BS1) 202 and a second base station, base station 2 (BS2) 204. BS1 202 has a nominal transmission power of a carrier with frequency A, $P_{A1}$, as represented by arrow 203, with a cellular coverage area enclosed by solid line circle 206. BS2 204 has a nominal transmission power of a carrier with frequency A, $P_{A2}$, as represented by arrow 205, with a cellular coverage area enclosed by solid line circle 208. Cellular coverage area 206, as shown, may be smaller than cellular coverage area 208 due to a lower level of transmission power of BS1 202 with respect to BS2 204 ($P_{A1}$ 203<$P_{A2}$ 205). FIG. 2A also includes a carrier frequency A boundary area 210 between adjacent cell areas 206 and 208. In FIG. 2B, an exemplary system 220 includes the two base stations, BS1 202 and BS2 204, each with a nominal transmission power of a carrier with frequency B, $P_{B,1}$ as indicated by arrow 223, $P_{B,2}$ as indicated by arrow 225, respectively, and each with a carrier frequency B cellular coverage area enclosed by dashed line circles 226, 228, respectively. Coverage area 226, as shown, is larger than coverage area 228, and may be due to a higher level of power applied at BS1 202 than at BS2 204 with respect to carrier with frequency B ($P_{B1}$ 223>$P_{B2}$ 225). FIG. 2B also includes a carrier frequency B boundary area 230 between cell areas 226 and 228.

Figure 2C:
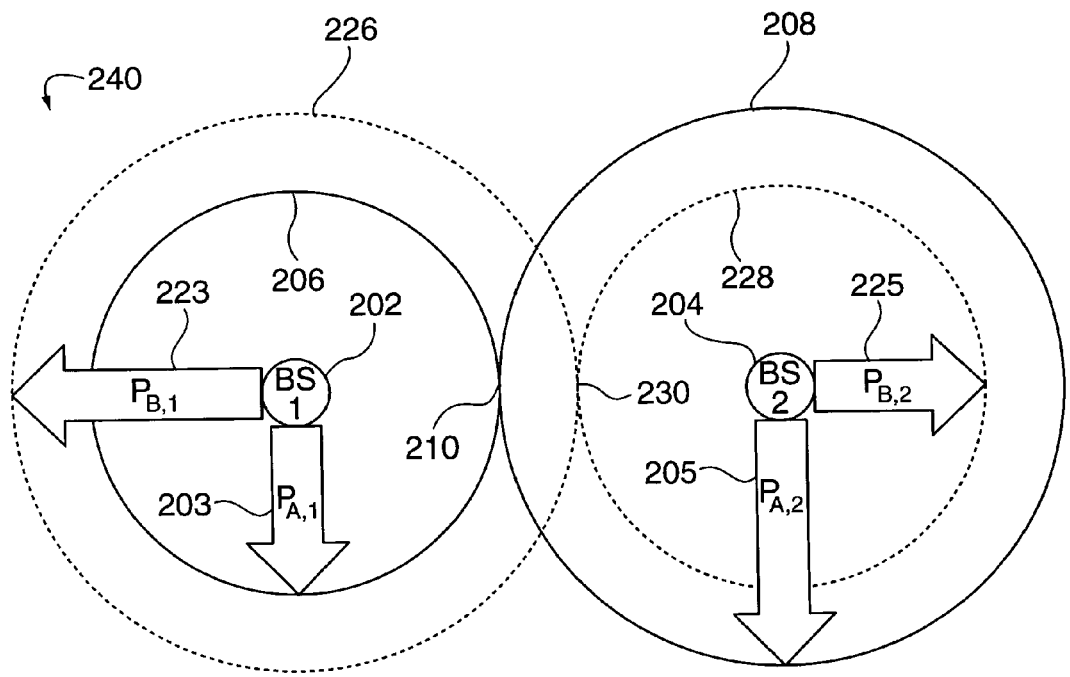
FIG. 2C shows the two adjacent base stations of FIG. 2A operating simultaneously on both carrier frequencies (a combination of FIG. 2A and FIG. 2B) illustrating that the power levels may be chosen such that the carrier frequency A cell boundary does not overlap the carrier frequency B cell boundary and illustrating multiple carrier diversity with regard to cells in accordance with the present invention.
Figure 2D:
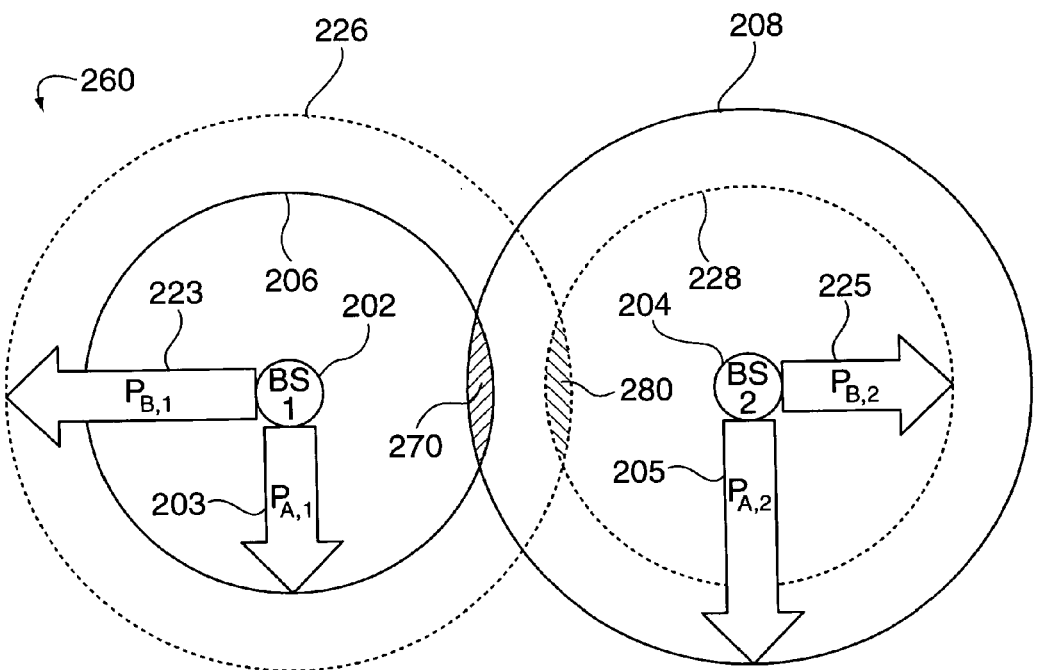
FIG. 2D illustrates a more realistic representation of FIG. 2C illustrating that the frequency A and B cell boundaries will actually be cell boundary regions, but that the power levels can be controlled as in FIG. 2C so that the boundary regions do not overlap in accordance with the invention.

In the exemplary system 240 of FIG. 2C (a combination of FIGS. 2A and 2B), both base stations 202, 204 are shown to use both carriers A and B simultaneously. In accordance with the invention, the transmission powers $P_{A,1}$, $P_{B,1}$ (203, 223) of the two carriers, A and B, respectively, in BS1 202 are selected to be different. Similarly, in accordance with the invention, the transmission powers $P_{A,2}$, $P_{B,2}$ (205, 225) of the two carriers, A and B, respectively, in BS2 204 are selected to be different. FIG. 2C shows that in BS1 202, the difference in the nominal transmission power of carrier A, $P_{A,1}$, 203 from that of carrier B is $P_{B,1}$.223, results in different size cellular coverage areas 206, 226, respectively for BS1 202. Similarly, in base station 2 204, the difference in the nominal transmission power of carrier A, $P_{A,2}$, 205 from carrier B, $P_{B,2}$., 225 results in different size cellular coverage areas 208, 228, respectively for BS2 204. The cell boundary between adjacent cell for carrier A 210 is determined by $P_{A,1}$ 203 and $P_{A,2}$,205 and the cell boundary between adjacent cells for carrier B 230 is determined by $P_{B,1}$ 223 and $P_{B,2}$ 225. The example of FIG. 2A, 2B, 2C shows an ideal case where the transmission powers have been matched precisely so that the A frequency boundary 210 is a single point and the B frequency boundary 230 is a single point. In actual operation, each carrier frequency boundary may be represented by a region of overlapping coverage between the two base stations 202, 204. In some embodiments each carrier frequency boundary region may be defined as an area where the difference in carrier signal strength, for a particular carrier frequency, from the base stations 202,204 is 3 dB or less. In other embodiments, a carrier frequency cell boundary region may be defined in terms of a signal difference of e.g., less than 1, 2, 4, 5 or 6 dB depending on the implementation. In still other embodiments, different levels of interference may define the carrier frequency cell boundary region. The exemplary system 260 of FIG. 2D illustrates a frequency A boundary region 270 and a frequency B boundary region 280. In accordance with the invention, the values of those transmission powers, $P_{A,1}$ 203, $P_{A,2}$ 205, $P_{B,1}$ 223, and $P_{B,2}$ 225 can chosen to be sufficiently different such that the cell boundary regions of carriers A and B (270, 280) are sufficiently non-overlapping. In one embodiment, $P_{A,1}=P_{B,2}<P_{B,1}=P_{A,2}$. FIGS. 2C and 2D show examples of cell boundaries of carriers A and B, that are apparently non-overlapping, in accordance with the invention.

In accordance with the present invention, different carriers have been utilized via a design approach to structure the system with non-overlapping cell boundaries, e.g. boundary region for carrier A 270 and boundary region for carrier B 280 of FIG. 2D are non-overlapping, creating a new type of diversity, namely 'multiple carrier diversity'. In particular, if a wireless terminal is located in the cell boundary region of one carrier, it is likely not in the cell boundary region of other carriers. Therefore, a wireless terminal may measure the signal quality of all the carriers and select to use a proper carrier such that the wireless terminal is not in the cell boundary region of the selected carrier. For example, with respect to FIG. 2D, if a wireless terminal is in the cell boundary region for carrier frequency A 270, it is not in the cell boundary region for carrier frequency B 280, and therefore should choose to operate on carrier frequency B. The idea of utilizing multiple carrier diversity is illustrated further in the flow chart of FIG. 3. Note that in the example a wireless terminal monitors signal interference associated with each of the carriers in a cell and proactively switches between them to select a carrier that is not a boundary carrier without necessarily losing contact with the base station on an existing carrier that is being used. For example, carrier switching may occur when an SNR decreases to between 6 and 0 dB and another carrier is available. In some embodiments, the carrier selection process, includes selecting the non-boundary carrier, with the least interference or the least traffic loading.

Figure 3:
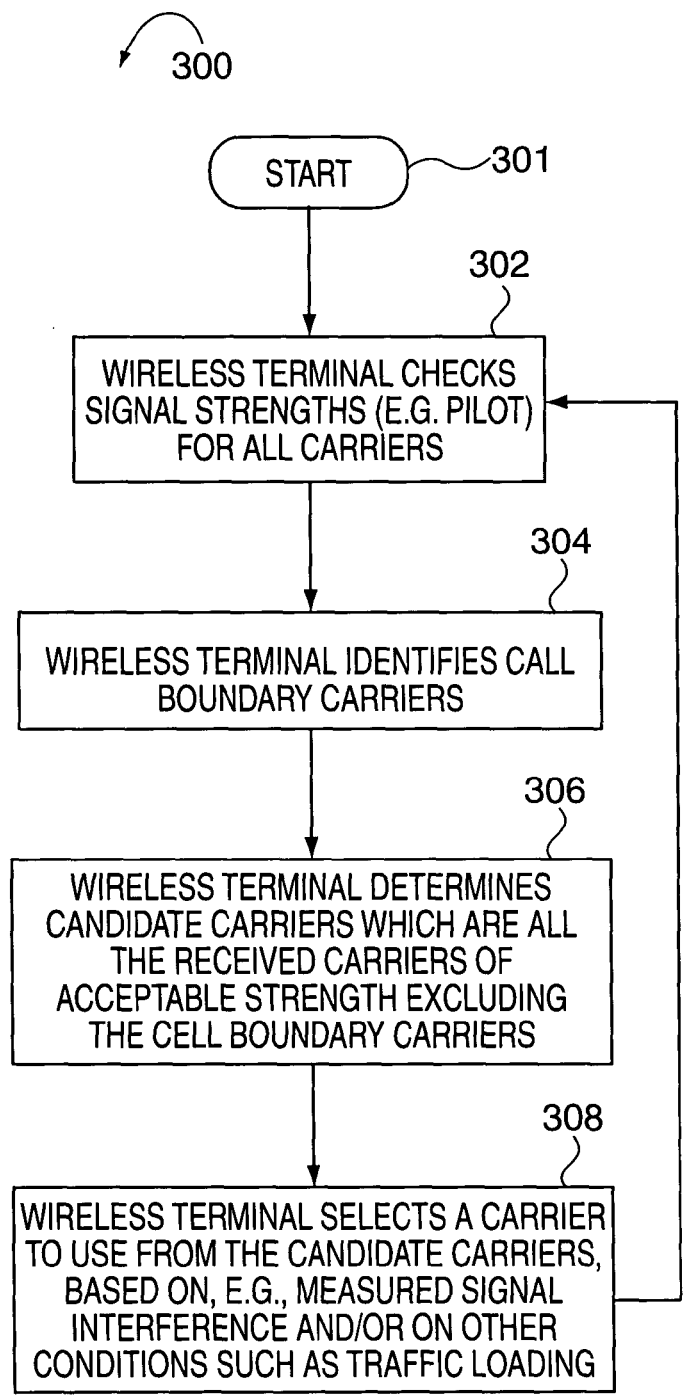
FIG. 3 illustrates a flow chart whose method may be implemented to exploit multiple carrier diversity with regard to cell boundaries in accordance with the invention.

FIG. 3 illustrates a flow chart 300 whose method may be implemented by a wireless terminal to exploit the multiple carrier diversity, in accordance with the invention. The process starts with step 301 where a wireless terminal is powered and able to receive base station signals. Operation proceeds to step 302, where the wireless terminal measures the signal strengths; e.g. via pilot tone reception measurements, of the adjacent base stations and the serving base station in all, or a subset of all, the carriers used by the base stations. There are several ways in which this can be achieved. One such receiver architecture has two Radio Frequency (RF) and baseband receiver chains. Each receiver chain includes a carrier filter and a demodulator arranged in series. Each of the receivers is capable of receiving one carrier with the filters of each chain being designed to pass the carrier frequency associated with the receiver chain while rejecting other carrier frequencies. Thus while one receiver is tuned to a particular carrier the other receiver chain can be used to search for alternative carriers. In accordance with the present invention, the analog filter(s) used in each filter chain is adjustable and/or programmable in order to be able to lock onto a particular selected carrier. This first approach uses two separate processing chains, e.g., relatively expensive analog processing chains. Normally, a mobile terminal doesn't talk to two carriers simultaneously because two separate analog processing chains would be required, resulting in an expensive implementation. Thus, for cost reasons, in many cases a single receiver chain is used.

If only one receiver chain is available, the wireless terminal may temporarily use its receiver to monitor other carriers when not processing the carrier currently being used to communicate with a base station. In accordance with one embodiment of the present invention, the analog filter is adjustable and programmable with the ability to lock onto a particular selected carrier. This is particularly possible and cost effective in a wireless data terminal, where the terminal can use the period of time during which no reception is needed from the current serving carrier to monitor other carriers.

A third alternative is to have a single radio frequency receiver capable of receiving signals encompassing several carriers and have base band receivers which can tune to the different carriers and measure their signal strengths. The analog filtering required for this method may also be adjustable and programmable.

Using the signal strength measurements of step 302, the wireless terminal in step 304 identifies whether it is located in the cell boundary region of any carriers. Those carriers, identified by the wireless terminal to be in a cell boundary region, are called and classified as cell boundary carriers. This may be done by comparing pilot tone strengths and determining if pilot tones from different cells have at least a 30% difference in received power with lower power differences being interpreted, in some embodiments as an indication of a device's presence in a cell boundary region. In other embodiments a power difference of 20% or less between carrier signals from different cells is used to define boundary regions. Alternatively, an SNR of 3 dB or less may be used as indicative of being in a cell boundary region. In some cases, the carrier selection process is performed when a decrease in the SNR is detected on the carrier being used and the SNR drops below an upper threshold, e.g., 3 dB, but still remains acceptable, e.g., above 0 dB.

Operation proceeds from step 302 to step 306, where the wireless terminal determines candidate carriers. The candidate carriers are those carriers which have been received in step 302 and deemed to be of acceptable signal strength but excluding the cell boundary carriers identified in step 304, e.g., carriers suffering from intercell interference of at least 30%. Next, in step 308, the wireless terminal determines which carrier to be used, e.g. as a function of signal interference, signal quality and/or other factors. In accordance with the invention, the wireless terminal selects from amongst the candidate carriers, if possible, and does not, if possible, select a cell boundary carrier. Among the candidate carriers, the wireless terminal may in step 308 select a carrier as a function of other conditions or concerns such as traffic loading. Traffic loading information may be obtained, e.g., based on information available to the node such as monitored channel assignment information. The above carrier monitoring and selection procedure may repeat periodically and/or frequently as implemented with operation returning to step 302.

Figure 4A:
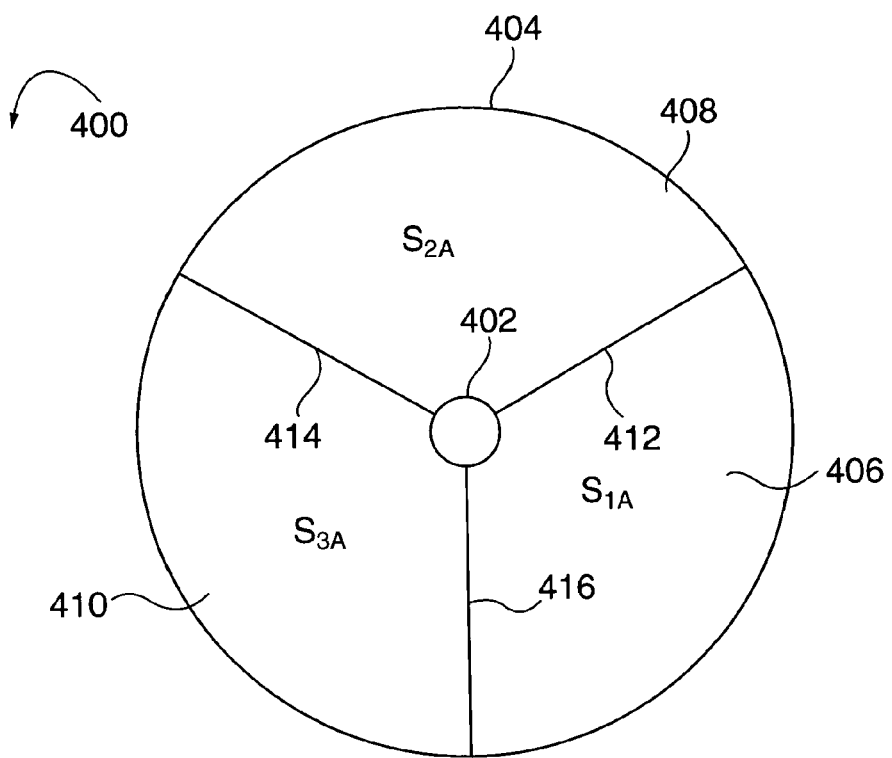
FIG. 4A illustrates a cell, subdivided into three sectors, surrounding a base station utilizing a sectorized antenna and operating on a first carrier frequency A.
Figure 4B:
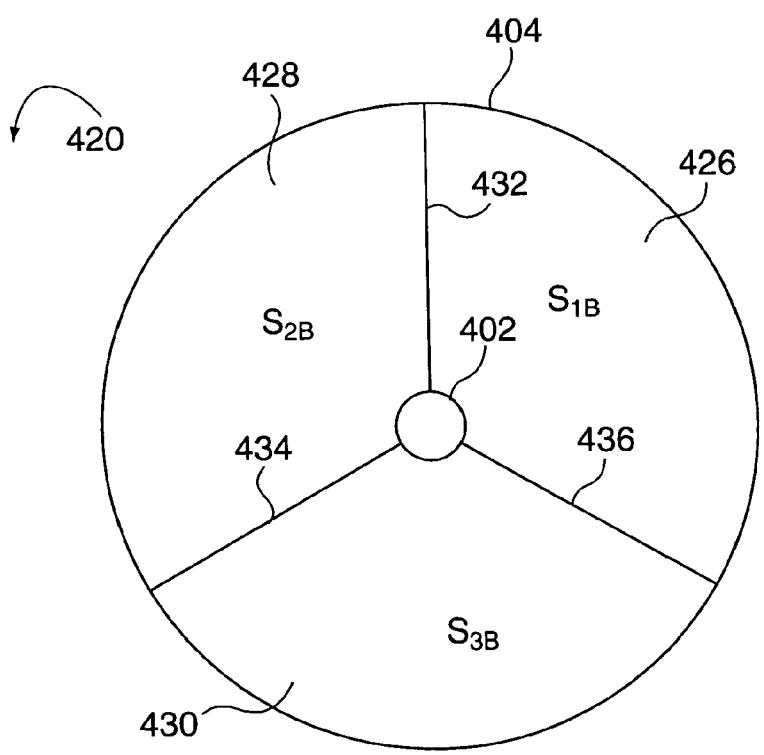
FIG. 4B illustrates the base station of FIG. 4A with a second sectorized antenna operating on a second carrier frequency B. The antenna of Fib 4B, has been offset 60 deg with respect to the antenna of FIG. 4A resulting in the three sectors of the cell of FIG. 4b being offset by 60 deg with respect to the three sectors of FIG. 4A.
Figure 4C:
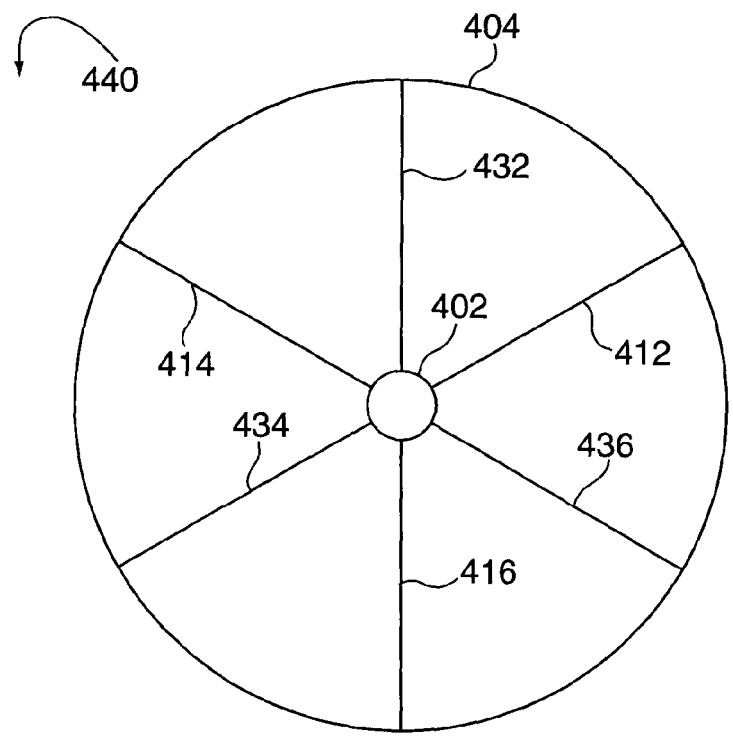
FIG. 4C is an overlay of FIGS. 4A and 4B showing the base station of FIG. 4A, simultaneously transmitting on the two carrier frequencies A and B and further illustrating that if the antennas are offset sufficiently, the sector boundary regions will not overlap. The implementation of FIG. 4c thus creates multiple carrier diversity with regard to sectors in accordance with the invention.
Figure 4D:
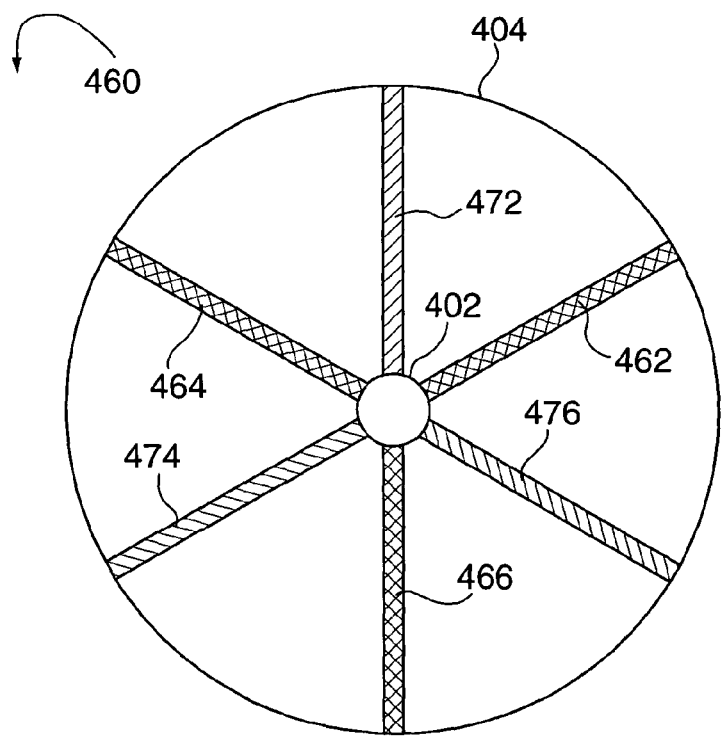
FIG. 4D illustrates a more realistic representation of FIG. 4C illustrating that the frequency A and B sector boundaries will actually be sector boundary regions, but that the antenna offset can be chosen as in FIG. 4C so that the boundary regions do not overlap in accordance with the invention.

FIGS. 4A, 4B, 4C, and 4D are used to illustrate another method of creating multiple carrier diversity, in accordance with the invention, in a sectorized environment. In this illustrated example, a base station 402 uses three-sector antennas. FIG. 4A illustrates an exemplary three sector cell 400 surrounding base station 402 with a coverage area 404 for a carrier of frequency A. The coverage area 404 is broken into three sectors: $S_{1A}$ 406, $S_{2A}$ 408, and $S_{3A}$ 410 with sector boundaries: sector boundary 1-2 412, sector boundary 2-3 414, and sector boundary 3-1 416. FIG. 4B illustrates an exemplary three sector cell 420 surrounding base station 402 with coverage area 404 for a carrier of frequency B. The coverage area 404 is broken into three sectors: $S_{1B}$ 426, $S_{2B}$ 428, and $S_{3B}$ 430 with sector boundaries: sector boundary 1-2 432, sector boundary 2-3 434, and sector boundary 3-1 436. FIG. 4C illustrates in cell 440 (as an overlay of FIGS. 4A and 4B, an exemplary case where base station 402 has two carriers, of frequency A and B, which are to be used in all the sectors simultaneously. The total coverage area 404 may be the same for both frequencies A and B. Normally, in sectorized cells using multiple frequencies, the antennas used for each frequency are aligned so that the sectors and sector boundaries are the same for each frequency. In accordance with the invention, the two three-sector antennas are placed such that the sectorization orientations of the two carriers at the base station 402 are sufficiently offset, e.g. 60 deg, as illustrated in FIG. 4C to provide 'multiple carrier diversity'. The example of FIG. 4C shows an offset of approximately 60 deg between the sector boundaries of the two carrier frequencies: (412,432), (414,434), (416,436). The sector boundaries 412, 414, 416, 432, 434, 436, i.e., boundaries between adjacent sectors, are shown in FIG. 4C for an idealized system. In actual operation, sector boundary areas will exist between the sectors for each frequency. In some embodiments each carrier frequency sector boundary region is defined as an area where the difference in carrier signal strength from the adjacent sector base station transmissions for a given carrier frequency is 3 dB or less. In other embodiments, different levels of interference may define the sector carrier frequency sector boundary region, e.g., differences of 2 dB may be used in some embodiments or other values such as 1 or 4 dB. FIG. 4D, illustrates an exemplary cell 460 with cellular coverage area 404 for base station 402 employing a 3 sector implementation with 60 deg offsets, and simultaneous dual carrier frequency operation. FIG. 4D includes frequency A sector boundary areas: boundary region 1-2 462, boundary region 2-3 464, and boundary region 3-1 466. The frequency A sector boundary regions 462, 464, 466 may be identified by crosshatch shading in FIG. 4D. FIG. 4D also includes frequency B sector boundary areas: boundary region 1-2 472, boundary region 2-3 474, and boundary region 3-1 476. The frequency B sector boundary regions 472, 474, 476 may be identified by diagonal line shading in FIG. 4D. The sector boundary regions of frequency A carriers 462, 464, 466 and the sector boundary regions of frequency B carriers 472, 474, and 476 are sufficiently non-overlapping, thereby creating multiple carrier diversity with regard to sectorization, similar to that shown in FIG. 2D with regard to cells. Wireless terminals in such a sectorized system may apply the same logic shown in FIG. 3 for cells, to sectors to utilize the advantages of multiple carrier diversity, in accordance with the present invention. Specifically, wireless terminals operating in an A carrier frequency boundary region 462, 464, 466 should and will choose to operate on carrier frequency B; while wireless terminals operating in a B carrier frequency boundary region 472, 474, 476 should and will choose to operate on carrier frequency A. Wireless terminals outside, the sector boundary regions 462, 464, 466, 472, 474, 476, yet still inside the cellular coverage area 404, may choose to operate on either carrier frequency A or B depending on other constraints such as loading and signal interference due to conditions other than inter-cell or inter-sector interference.

Figure 5:
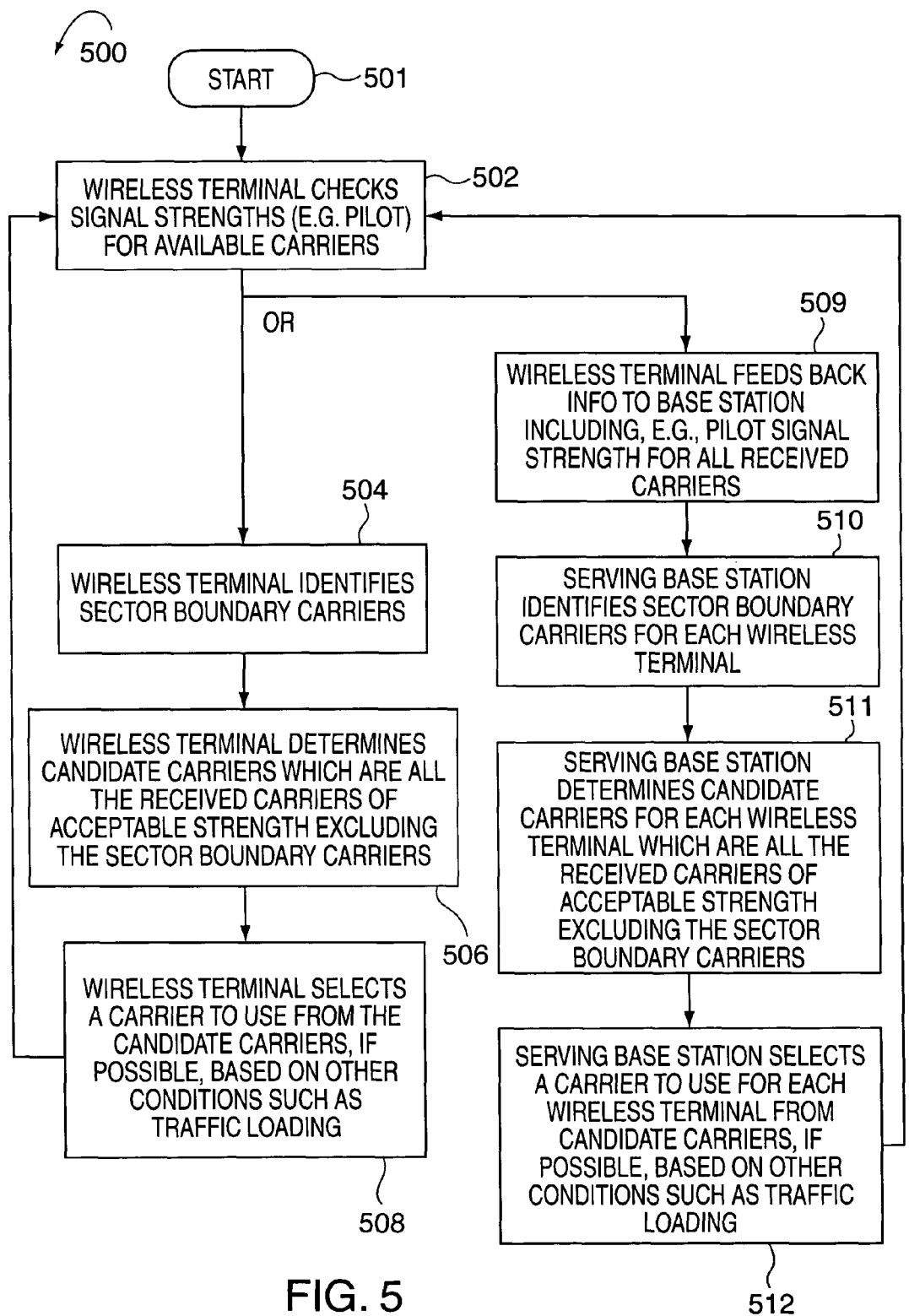
FIG. 5 illustrates a flow chart whose method may be implemented to exploit multiple carrier diversity with regard to sector boundaries in accordance with the invention.

FIG. 5 illustrates a flow chart 500 whose method may be implemented by a wireless terminal to exploit multiple carrier diversity with regard to sectorization, in accordance with the invention. The process starts with step 501 where a wireless terminal is powered on and capable of receiving base station signal. Operation proceeds to step 502 where the wireless terminal measures the signal strengths of the available sector transmissions (e.g. pilots) from the serving base station for all or a subset of all the carriers. There are several ways in which this can be achieved, depending on receiver design, as previously described in detail with respect to FIG. 3.

Next, in one embodiment, using the signal strength measurements of step 502, the wireless terminal in step 504 identifies whether it is located in the sector boundary region of any carriers. Those carriers, identified by the wireless terminal to be in a sector boundary region, are called and classified as sector boundary carriers. This determination may be based on signal interference levels. Operation proceeds to step 506, where the wireless terminal determines candidate carriers. The candidate carriers are those carriers which have been received in step 502 and deemed to be of acceptable signal strength excluding the sector boundary carriers identified in step 504. Next, in step 508, the wireless terminal determines which carrier to be used. In accordance with the invention, the wireless terminal selects from amongst the candidate carriers, if possible, and does not, if possible, select any sector boundary carrier. Among the candidate carriers, the wireless terminal may in step 508 select the carrier as a function of one or more conditions or concerns such as traffic loading. The above carrier monitoring and selection procedure may repeat periodically and/or frequently as implemented with operation returning to step 502. The carrier selection process occurs even when the existing carrier remains suitable for use, e.g., has an SNR of above 0 dB. In some embodiments, the carrier signal is deemed unsuitable for use when the interference signal has a power level 80% of the power level of a signal of interest. To reduce the number of handoffs, the selection process may be limited to cases where a decrease in SNR below a threshed level is detected as will occur upon entry into a boundary area. The handoff may further be restricted by requiring the decrease in SNR to be maintained for some predetermined period of time. Drops below a second threshold, e.g., 1 dB may trigger an immediate handoff. Given the described intercarrier handoff process, the wireless terminal may switch repeatedly between carriers while communicating with the same base station even though an existing carrier remains acceptable, e.g., above 0 dB in terms of SNR.

Alternately, in another embodiment, operation proceeds from step 502 to step 509, in which the wireless terminals feeds back information to the serving base station including, e.g. signal strength/quality of the received sector transmissions from the serving base station for the carriers. Proceeding to step 510, the serving base station identifies the sector boundary carriers for each wireless terminal. Next, in step 511, the serving base station determines candidate carriers for each wireless terminal, which are the received carriers of step 502 of acceptable strength excluding the sector boundary carriers identified in step 510. Next, in step 512, the serving base station determines which carrier to be used for each wireless terminal. In accordance with the invention, the serving base station selects for each wireless terminal from amongst the specific wireless terminal's candidate carriers, if possible, and does not, if possible, select a sector boundary carrier. Among the candidate carriers, the serving base station may for each wireless terminal in step 512 select the carrier according to various conditions or concerns such as traffic loading. The above carrier monitoring and selection procedure may repeat periodically and/or frequently as implemented with operation returning to step 502.

The same methods of creating multiple carrier diversity can be used in a beam-forming multiple antenna system, where a different set of antenna coefficients are used for different carriers to create different carrier transmission patterns. In such a case, in accordance with the invention, the boundary areas of different carriers are generated to avoid overlapping boundary areas.

The two methods shown in FIGS. 2A,2B,2C,2D and FIGS. 4A,4B,4C,4D can be combined to minimize or eliminate overlapping boundary areas corresponding to different carriers.

Although shown for exemplary cases of 2 cells in FIGS. 2A,2B,2C,2D and 3 sectors in FIG. 4A,4B,4C,4D, the concepts are equally applicable and may be extended to other implementation involving other numbers of cells and/or cells with other numbers of sectors.

The two methods of creating multiple carrier diversity shown in FIGS. 2A,2B,2C,2D and FIGS. 4A,4B,4C,4D can be generalized in accordance with the invention. In general, the boundary regions (e.g., cell boundary, or sector boundary) are determined in large part by some system parameters used by the base stations, such as the transmitted power of base stations or offsets between sectorized antennas. In accordance with the invention, these system parameters are selected in the system design and purposely made different for different carriers such that the boundary regions of individual carriers have minimum or even zero overlap. The wireless terminals moving throughout the system may exploit the multiple carrier diversity that has been established by, identifying and excluding any boundary carriers, and then selecting to operate on another available non-boundary carrier, which has been made available by the multiple carrier diversity.

Figure 6:
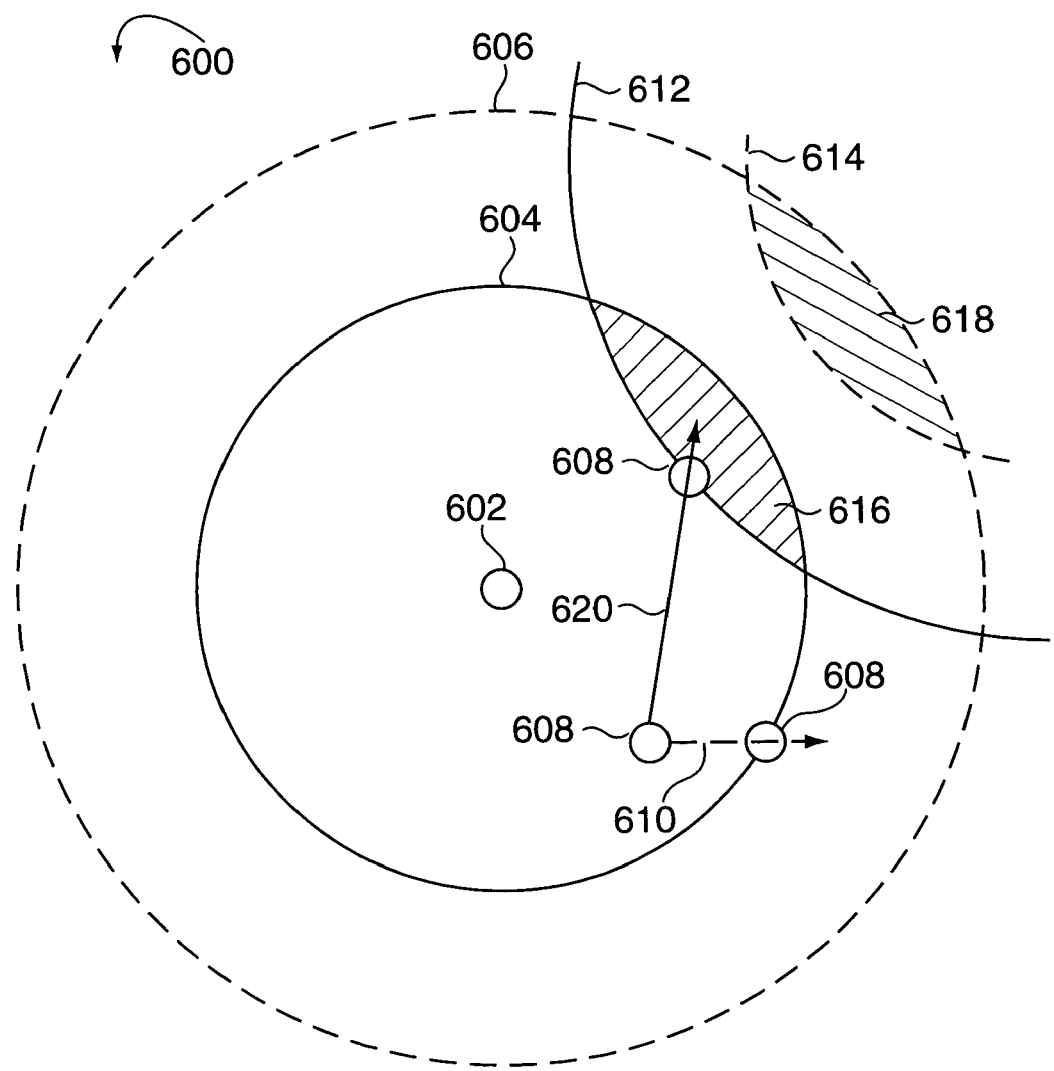
FIG. 6 illustrates an example of an inter-carrier handoff at a single base station using multiple carriers of different power levels in accordance with the present invention.

FIG. 6 600 illustrates examples of inter-carrier handoffs at a single base station 602 using multiple carriers of different power levels in accordance with the present invention. A cell boundary 604 for carrier frequency A represents the coverage area in which an exemplary wireless terminal 608 may communicate using carrier frequency A with base station 602 under ideal conditions, while a cell boundary 606 for carrier frequency B represents the coverage area that the exemplary wireless terminal 608 may communicate using carrier frequency B with base station 602 under ideal conditions. Cell boundary 612 for carrier frequency A represents the coverage area in which exemplary wireless terminal 608 may communicate using carrier frequency A with an adjacent base station, while a cell boundary 614 represents the coverage area in which the exemplary wireless terminal 608 may communicate using carrier frequency B with the adjacent base station. Area 616, shown with line shading ascending from left to right, represents a carrier frequency A boundary region between adjacent cells. Area 618, shown with line shading descending from left to right, represents a carrier frequency B boundary region between adjacent cells. A dashed line arrow 610 represents wireless terminal, e.g. mobile node, 608 crossing carrier frequency A cell boundary 604. A solid line arrow 620 represents wireless terminal, e.g., mobile node 608 crossing into a carrier frequency A boundary region between adjacent cells 616.

Typically, in previous wireless systems with a single base station using multiple carrier frequencies, the transmission power level would be substantially equivalent for the multiple carriers used, resulting in the same cell boundaries for all carrier frequencies. As a wireless terminal moved throughout the cell, it would lock onto one frequency and remain on that one frequency while communicating with that base station until a hand-off occurs to another adjacent cell with a new base station or until reception is lost due to some variation such as a change of natural conditions, e.g., physical obstructions, weather conditions, etc. In accordance with the invention, the wireless terminal proactively monitors and searches for alternative carriers and performs inter-carrier hand-offs using the same base stations as part of normal operation resulting in better traffic load balancing, increased efficiency, and an improvement in system performance. In one example, wireless terminal 608, located within the cell boundaries for both frequencies A and B (604,606), respectively, may have locked onto a specific carrier, e.g. the stronger carrier frequency, B; however, the wireless terminal 608 may decide to move to another carrier, e.g. carrier frequency A, for load balancing purposes, and thus perform an inter-carrier handoff at base station 602. This inter-carrier hand-off would free up the higher power carrier frequency for use by another wireless terminal at a different location that may require increased signal strength to continue operation. In another example, the wireless terminal 608 may be operating on the weaker carrier signal, e.g. carrier A, but may have detected by monitoring that the loading on carrier B, the stronger carrier signal, is light enough that it may and then does transition to carrier B; this may result in the power expenditure of wireless terminal 608 being reduced, an important consideration for wireless devices operating on limited battery resources. In another example, wireless terminal 608 may lose the one carrier, e.g. carrier frequency A, that it is using as it crosses cell boundary for carrier frequency A 604, as illustrated by dashed arrow 610. The cell boundary for carrier frequency A 604 is actually an intracell carrier frequency A boundary region. In some embodiments this intracell boundary region may be defined as an area where the difference in carrier signal strength from the base station falls off to approximately 0 dB. In other embodiments, different levels of signal strength may define the intracell carrier frequency cell boundary regions, e.g., SNR levels of 1, 2, 3, 4, 5 or 6 dB or less may, and sometimes are, used to define cell boundary regions. A switch to carrier frequency B, from carrier A, is used to maintain or to reestablish communications. In accordance with the invention, the wireless terminal, e.g. mobile node 608 proactively monitors and searches for alternative carriers, collects data on the carriers, makes decisions on which carrier to be used within the cell and/or feeds back information to the base station 602 to decide which carrier to use with the cell. This allows the system 600 to anticipate the necessity of inter-carrier hand-offs at the single base station 602 and efficiently perform the inter-carrier handoff operations before loss of communication occurs or with minimal disruption of communications between the base station 602 and the mobile 608.

In another example, of an intracell intercarrier handoff, wireless terminal 608 is located within the cell boundaries for both carrier frequency A and B, (604,606), respectively, and is operating on carrier frequency A to communicate with base station 602. Wireless terminal 608 moves and crosses into the boundary region between adjacent cells for carrier frequency A 616. The wireless terminal 608 has been proactively searching for candidate carriers. The wireless terminal 608 proactively switches to carrier frequency B once it detects that the current serving carrier, carrier frequency A, is becoming a boundary carrier. At the time of handoff, the quality of the current serving carrier is better than in traditional handoff scenarios. This results in an improved level of communications, over traditional handoff scenarios, with minimal or no disruptions in service between wireless terminal 608 and base station 602 during the handoff process. Subsequent to the handoff, the multiple carrier diversity, of the present invention, results in an improved level of performance, over tradition handoffs, because the new operational carrier, carrier B is not a boundary carrier.

Throughout the area of coverage by the base station 602, the actual power reception levels of the wireless terminals may vary normally due to natural condition, e.g. obstructions, weather conditions, etc. Typical multi carrier implementations use only one power level for all the carrier frequencies at the same base station; however, the present invention uses different power levels for different carrier frequencies at the same base station. If a wireless terminal is operating on a frequency and begins to lose signal due to a natural cause, with the typical implementation the signal may be expected to have degraded equally on all the potential frequencies, and communications may be lost. However; with the implementation of the present invention, the wireless terminal 608 may select to perform an inter-carrier handoff at base station 602 to another carrier frequency, if available, that has been allocated a higher level of power transmission by the base station 602 resulting maintained communications between base station 602 and wireless terminal 608.

Figure 7:
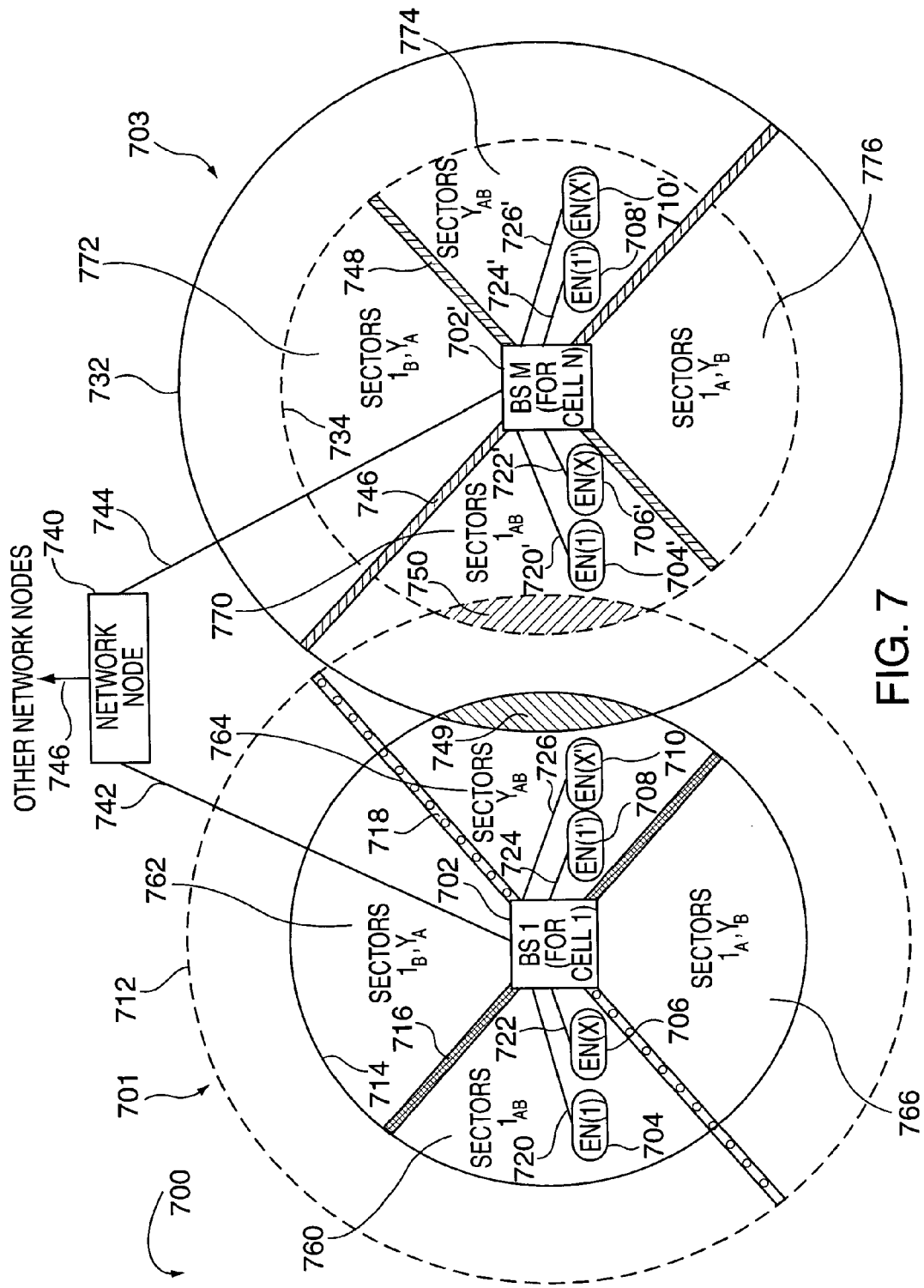
FIG. 7 illustrates an exemplary communications system implementing multiple carrier diversity across cells and sectors in accordance with the present invention.

FIG. 7 illustrates an exemplary communications system 700 implementing multiple carrier diversity across both cells and sectors in accordance with the present invention. The communications system 700 includes a plurality of base stations, base station 1 702 with a coverage area defined by cell 1 701, base station M 702' with a coverage area defined by cell N 703. Each base station 702, 702' of exemplary system 700, as shown, may operate on two carrier frequencies A and B at different power levels, in accordance with the invention. For base station 1 702, the power level for carrier frequency A is less than the power level for carrier frequency B; therefore, a cell 1 boundary for frequency A (solid line circle) 714 is smaller than a cell 1 boundary for frequency B (dashed line circle) 712. Cell 1 701 includes a coverage area which is the composite of the areas defined by boundaries 712 and 714. For base station M 702', the reverse is true. The power level for carrier frequency B is less than the power level for carrier frequency A; therefore, a cell N boundary for frequency B (dashed line circle) 734 is smaller than a cell N boundary for frequency A (solid line circle) 732. Cell N 703 includes a coverage area which is the composite of the areas defined by boundaries 732 and 734. A carrier frequency A boundary region for cells 1 and N is represented by the ascending line shaded area 749; a carrier frequency B boundary region for cells 1 and N is represented by the descending line shaded area 750. The two cell boundary regions 749 and 750 do not overlap by design in accordance with the invention. In general, base stations may operate on multiple carrier frequencies at different power levels, in accordance with the invention.

Base station 1 702 may transmit to a plurality of sectors, which subdivide the cellular coverage area for cell 1. Base station 1 702 is configured with a plurality of multisector antennas, one for each carrier frequency used. Information on two sectors: designated sector 1 and sector Y are shown in FIG. 7 for simplicity. The base station's antennas are offset sufficiently so that the boundary regions between sectors do not overlap in accordance with the invention. With respect the base station 1 702, an area with crosshatched shading 716 represents the sector 1/sector Y boundary area for carrier frequency A; an area with small circle shading 718 represents the sector 1/sector Y boundary area for carrier frequency B. Area 760 represents sector 1 non-boundary area for both carrier frequencies A and B. Area 762 represents sector Y non-boundary area for frequency A and sector 1 non-boundary area for frequency B. Area 764 represents sector Y non-boundary area for both frequencies A and B. Area 766 represents sector 1 non-sector boundary area for frequency A and sector Y non-sector boundary area for frequency B.

Similarly, the cellular coverage area for base station M 702' may be subdivided into sector boundary areas: sector 1/sector Y boundary area for frequency A 746 (horizontal line shading), sector 1/sector Y boundary area for frequency B 748 (vertical line shading), and non-sector boundary areas: sector 1 frequencies A and B area 770, sector 1 frequency B/sector Y frequency A area 772, sector Y frequencies A and B area 774, and sector 1 frequency A/sector Y frequency B area 776.

Base station 1 702 is coupled to a plurality of end nodes (ENs), e.g. wireless terminals such as mobile nodes (MNs), fixed wireless devices, etc., in sector 1: EN(1) 704, EN(X) 706 via wireless links 720, 722, respectively. Similarly in sector Y base station 1 702 is coupled to a plurality of end nodes in sector Y: EN(1') 708, EN(X') 710 via wireless links 724, 726, respectively.

Similarly, base station M 702' is coupled to ENs 704', 706', 708', and 710' via wireless links 720', 722', 724', and 726', respectively.

The ENs 704, 706, 708, 710, 704', 706', 708', and 710' may move throughout the system 700, establish a communication session with a peer node, e.g., another end node, establish communication with the base stations 702, 702', and exchange data and information directly with the base stations 702, 702' over the air. The ENs, e.g. EN(1) 704, in accordance with the invention, proactively monitor signal strengths and/or quality for available carrier frequencies, identify any cell and/or sector boundary carrier frequencies, determine possible candidate carriers, and select a carrier to use to minimize any boundary problems. The ENs can also decide to make inter-frequency handoffs between carriers at a single base station, and may select or change carriers based on non-boundary considerations, e.g., traffic loading, in order to optimize performance.

The base stations 702, 702' are coupled to a network node 740 via network links 742, 744, respectively. The network node may couple the system 700 to other network nodes, e.g. other bases stations, access routers, intermediate nodes, home agent nodes, or Authentication, Authorization, Accounting (AAA) server nodes via network link 746. Network links 742, 744, and 746 may be, e.g. fiber optic cables.

Consider that an exemplary EN, for example EN(1) 704, is moving throughout the area of potential coverage for communications with base station 1 702. If EN 704 is outside boundary 714, it will not use frequency A to communicate with BS1 702 because of insufficient reception strength. If EN 704 is located in cellular boundary region 749, it is restricted, from using frequency A (a cell boundary carrier) to communicate, but may use frequency B to communicate with BS1 702. If EN 704 is in boundary region 750, it is restricted from using frequency B (a cell boundary carrier) to communicate, but may use frequency A to communicate with BS M 702'. If EN 704 is in sector boundary region 716, it is restricted from using frequency A (a sector boundary carrier), but may use frequency B to communicate with BS1 702. If EN1 704, is in sector boundary region 718, it is restricted from using frequency B (a sector boundary carrier) to communicate with BS1 702, but may use frequency A provided EN 704 is within boundary 714. In the remaining areas of potential BS1 702 coverage there is no restriction, and BS1

702 may select from either frequency based on other considerations such as traffic loading.

Figure 8:
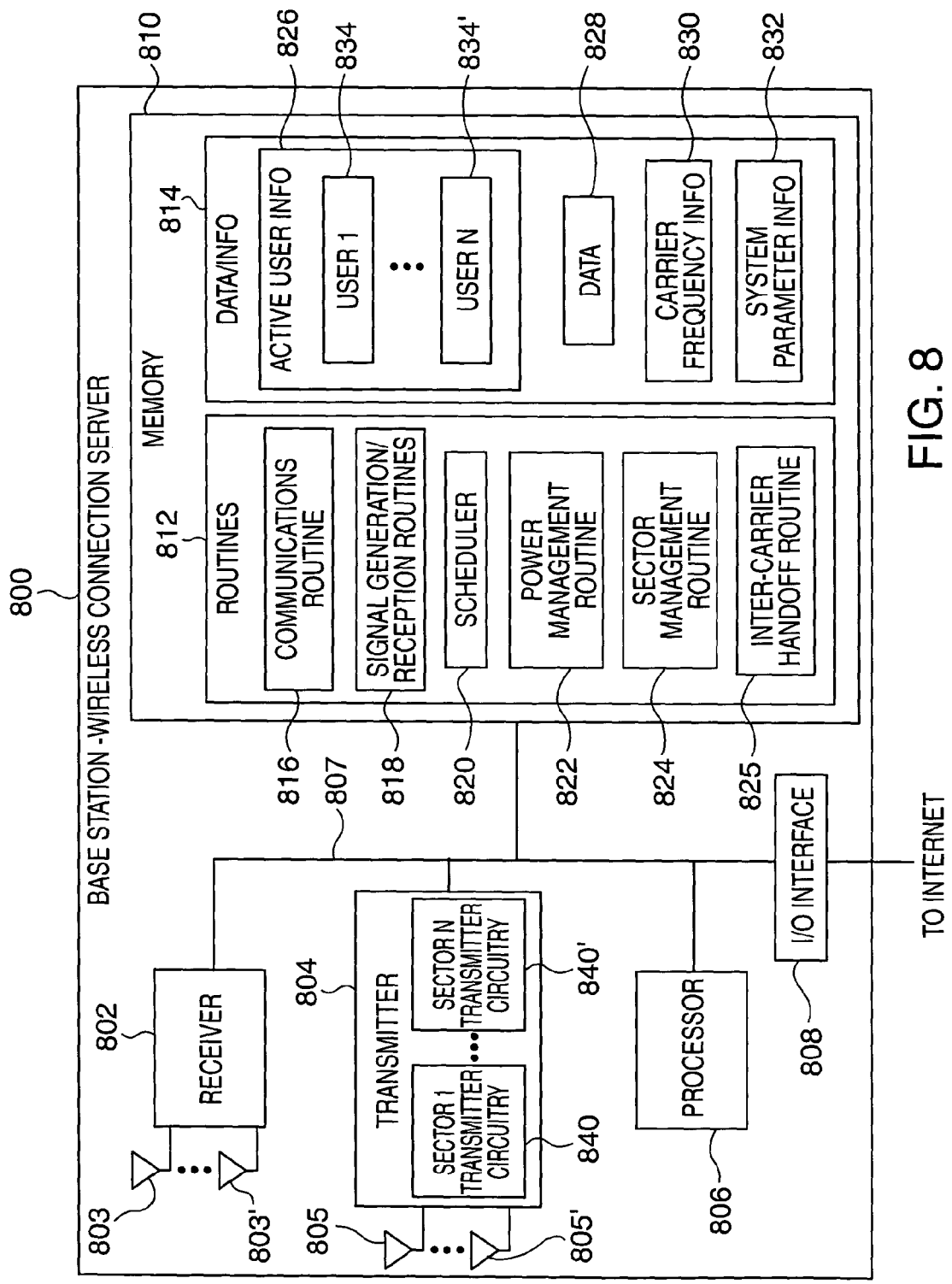
FIG. 8 illustrates an exemplary base station implemented in accordance with the present invention.

FIG. 8 illustrates an exemplary base station (BS) 800 implemented in accordance with the present invention. Exemplary base station 800 may be a more detailed representation of base stations 202, 204 of FIG. 2, 402 of FIG. 4, 602 of FIG. 6, and 702, 702' of FIG. 7. As shown, the exemplary BS 800 includes a receiver circuit 802, transmitter circuit 804, processor 806, e.g, CPU, memory 810 and an I/O network interface 808 coupled together by a bus 807. The receiver circuit 802 is coupled to one or more antennas 803, 803' for receiving signals from end nodes 900 (See FIG. 9), e.g., wireless terminals such as mobile nodes. The transmitter circuit 804 is coupled to one or more transmitter antennas 805, 805' which can be used to broadcast signals to end nodes 900. In the sectorized embodiment, the transmitter circuit 804 may include a plurality of sector transmitter circuits, sector 1 transmitter circuitry 840, sector N transmitter circuitry 840'. The receiver circuit 802 and the transmitter circuit 804 shall be capable of operating on a plurality of carrier frequencies. In some embodiments, the transmitter 804 shall operate at different power levels corresponding to different carrier frequencies in order to create distinct cell boundaries for each carrier frequency. The receiver circuit 802 may include a de-scrambler circuit and the transmitter circuit 804 may include a scrambler circuit in various embodiments of the invention. The antennas 803, 803', 805, 805' may be sectorized antennas in various embodiments. In some embodiments, multiple transmitter antennas 805, 805' may exist for each of the base station's 800 carrier frequencies, and each sectorized antenna 805, 805' may be offset by a sufficient amount to prevent or minimize sector boundary overlap regions. In some embodiments, one pair of sectorized receiver/transmitter antennas 803/805, 803'/805' may exist for each of the base station's 800 carrier frequencies; each pair of the sectorized antennas may be offset to prevent or minimize sector boundary overlap regions. The network I/O interface 808 is used to couple the base station 800 to one or more network elements, e.g., routers and/or the Internet. In this manner, the base station 800 can serve as a communications element between end nodes 900 serviced by the base station 800 and other network elements.

Operation of the base station 800 is controlled by the processor 806 under direction of one or more routines 812 stored in the memory 810 which control the basic functionality of the base station 800 and implement the various features and methods of the present invention. Memory 810 includes routines 812 and data/information 814. The routines 812 include a communications routine 816, signal generation/reception routines 818, a scheduler 820, a power management routine 822, a sector management routine 824, and an inter-carrier handoff routine 825. Data/Information 814 includes active user information 826, data 828, carrier frequency information 830, and system parameter information 832.

Communications routines 816, include various communications applications which may be used to provide particular services, e.g., IP telephony services or interactive gaming, to one or more end node 900 users. Signal generation/reception routines 818 utilize the data/info 814, e.g, data 828, system parameter information 832, and carrier information 830 to provide the required signal synchronization, generation, reception and processing. The scheduler 820 may perform assignments of users (end nodes 900) to operate: on specific carrier frequencies, on specific channels using specific subcarrier frequencies, within specific sectors, at specific times. The scheduler 820 may use active user info 826 in making scheduling decisions between various end nodes 900 in order to minimize disruptions on cell/sector boundaries, more efficiently load balance the system, and satisfy the needs and requests of the various end nodes 900. Power management routine 822 may utilize the data/info 814, e.g., carrier frequency information 830 and system parameter information 832 to control and regulate the different power levels that may be assigned to each carrier frequency used by the base station 800 thus creating different cell boundaries for different carrier frequencies in accordance with one embodiment of the present invention. Sector management routine 824 may use the data/info 814, e.g., carrier frequency information 830 to establish and control different non-overlapping sector boundaries for different carrier frequencies in accordance with one embodiment of the present invention. Inter-carrier handoff routine 825 may utilize the data/info 814 including carrier frequency info 830 and active user information 826 to perform a hand-off operation between different carrier frequencies for a user, e.g. mobile node 900, while still maintaining attachment to the same base station 800, due to a request from a user triggered by items such as: the identification of a sector boundary carrier, the identification of a cell boundary carrier, a change in conditions, an attempt to better load balance the system in accordance with some embodiments of the invention. In accordance with other embodiments of the invention, the decision to perform an inter-carrier hand-off operation may be made by the base station 800 based on data/info 814, e.g, active user information 826, carrier information 830, e.g., current traffic loading on each carrier, and other information available to the base station 800. In some embodiments, the inter-carrier hand-off routine 825 may use feed back information from the wireless terminal 900, e.g., active user info 826 such as intercell and/or intracell interference information to determine whether the wireless terminal 900 is in a boundary or non-boundary region. In a boundary region intra-cell and intra-sector carrier handoffs may be initiated even though communication with a wireless terminal remains possible using a carrier already being used to communicate with the wireless terminal. If in a non-boundary region, inter-carrier hand-off routine 825 may make decisions and perform carrier handoff operations as a function of other system consideration such as loading. In some cases, system loading as opposed to interference considerations will trigger an intra-cell and/or intra sector carrier handoff.

Active user information 826 includes information for each active user and/or end node 900 serviced by the base station 800. For each of a plurality of end nodes 900 and/or users it includes a set of information: user 1 info 834, user N info 834'. The user information 834, 834' includes, state information, e.g., whether the mobile node 900 is in an on state, a hold state, a sleep state, or an access state, number and types of data packets currently available for transmission to or from the end node 900, assigned carrier frequency, assigned sector, and information on the communication resources used by the end node 900. The user information 834, 834' may also include information feed back from the end node 900 such as received pilot signal strength, recognized boundary carriers, requested carrier hand-offs, channel quality information, intercell interference information, and intracell interference information. Data 828 may include data to be transmitted to, or received from, one or more end nodes 900. Examples of data 828 may include, e.g., voice data, E-mail messages, video images, game data, etc. Carrier frequency information 830 may include the carrier frequencies assigned to the base station 800 and associated information such as corresponding power level assignments, actual operational power levels, traffic loading, corresponding sector assignments, sector traffic loading for each carrier frequency and sector specific parameters such as e.g. antenna offsets and sector specific encoding/decoding sequences, and corresponding programmable filter values required to process the various carrier frequencies. System parameter information 832 may include, e.g., transmitted pilot power levels, data/control and pilot hopping sequence values for the cell and sectors of the base station 800.

Figure 9:
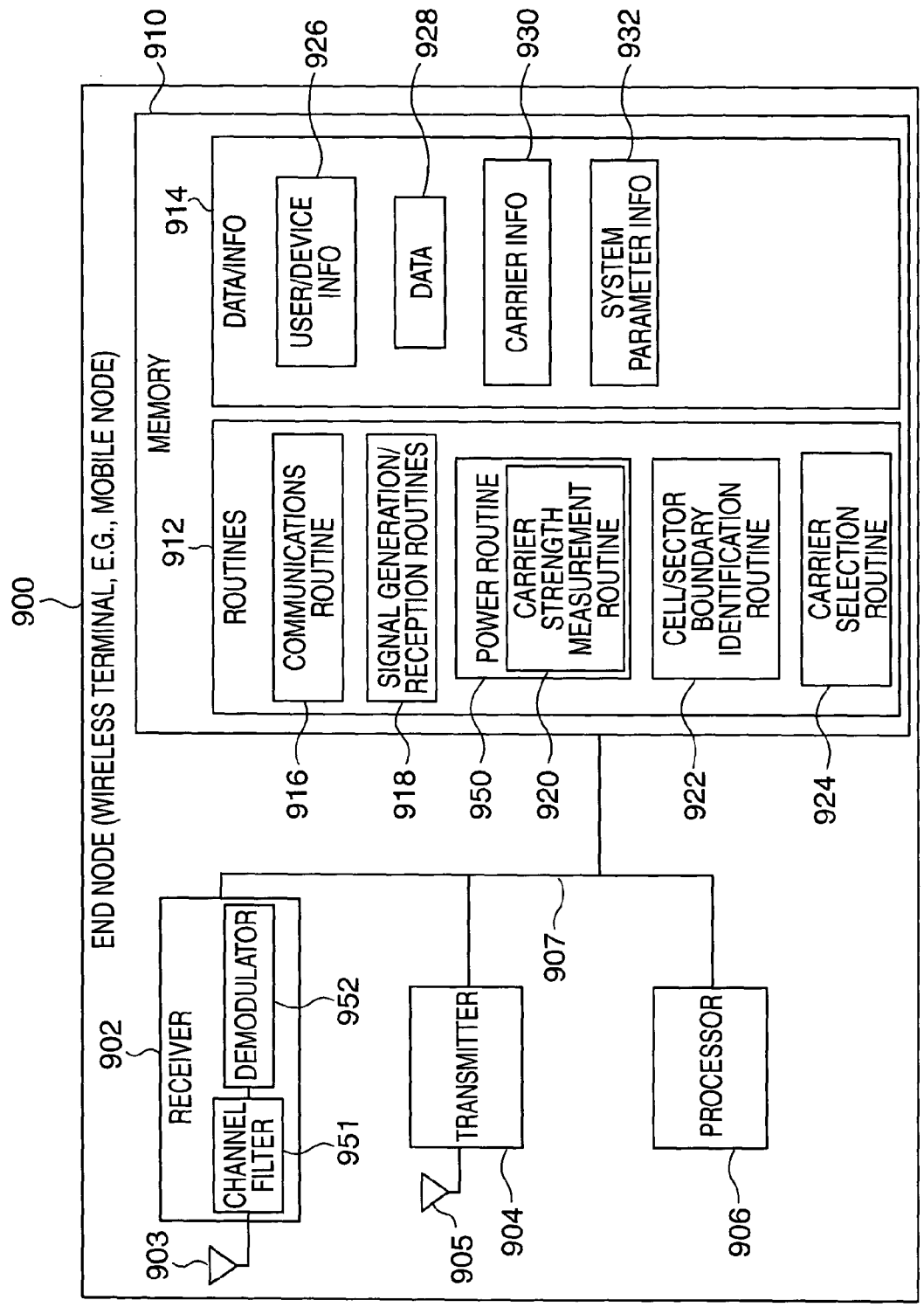
FIG. 9 illustrates an exemplary end node (wireless terminal, e.g., mobile node) implemented in accordance with the present invention.

FIG. 9 illustrates an exemplary end node 900 implemented in accordance with the invention. Exemplary end node 900 may be a wireless terminal, e.g., mobile node or stationary wireless communications device. End node 900 may be a more detailed representation of the wireless terminal previously described with respect to the invention in FIGS. 2-8 such as EN 608 of FIG. 6 or EN(1) 704 of FIG. 7. The exemplary end node 900 includes a receiver 902 coupled to an antenna 903, a transmitter 904, coupled to an antenna 905, a memory 910 and a processor 906. The receiver 902, in the illustrated embodiment includes a single receiver chain including a channel filter 951 and demodulator 952. In some embodiments, multiple receiver chains are used to allow for multiple carriers to be received and processed at the same time. Channel filter 951 is adjustable so that the passband of the filter can be selected to correspond to the carrier being received at any point in time. The various elements of the end node 900: receiver 902, transmitter 904, processor 906, and memory 910 are coupled together via bus 907. The end node 900 uses its transmitter 904, receiver 902, and antennas 905, 903 to send and receive information to and from base station 800. The transmitter 904 and receiver 902 shall be capable of operating on multiple carrier frequencies as utilized by the various base stations 800. In some embodiments, the transmitter 904 and the receiver 902 may include encoder/decoder circuits to match the base stations 800. In various embodiments of the invention, the receiver 902 and/or the transmitter 904 shall have programmable analog filters to allow a single analog circuit path to be utilized for multiple carrier frequencies thus reducing cost. Various embodiments of the receiver 902 are possible as previously described with respect to FIG. 3 including: two RF and baseband receiver chains where one chain is tuned to a particular carrier and the other chain searches for alternative carriers, one RF and baseband receiver chain where the receiver 902 uses the times during which no reception is required from the current serving carrier to monitor other alternative carriers, and a single RF receiver capable of receiving signals encompassing several carriers and have baseband receiver which can tune to different carriers and measure their signal strength.

Memory 910 includes routines 912 and data/info 914. The routines 912 may include a communications routine 916, signal generation/reception routines 918, a transmission power control and power control signaling routine 950 including a carrier strength measurement routine 920, a cell/sector boundary identification routine 922, and a carrier selection routine 924. The data/info 914 may include user/device information 926, data 928, carrier information 930, and system parameter information 932. The end node 900 operates under control of the modules or routines 912, which are executed by the processor 906 in order to perform the basic functionality of the end node 900 and implement the methods and improvements in accordance with the present invention. User/device information 926 includes device information, e.g., a device identifier, a network address or a telephone number. This information can be used, by the base station 800, to identify the end nodes 900, e.g., when assigning communications channels. The user/device information 926 includes information concerning the present state of the end node 900, e.g., whether the mobile node 900 is in an on state, a hold state, a sleep state, or an access state, number and types of data packets currently available for transmission to or from the base station 800, levels of overall interference, intercell interference for each carrier, intersector interference for each carrier. The data 928 includes, e.g., voice, text and/or other data received from, or to be transmitted to, the base station 800 as part of a communications session. Carrier information 930 may include information such as carrier measured pilot strength levels for detected carrier frequencies, active list of candidate carriers, intercell channel interference, intersector channel interference, active list of identified cell/sector boundary carriers, active carrier, requested new carrier, etc. System parameter information 932 may include information such as carrier frequency assignments to specific cells/base stations and/or sectors, hopping sequence parameters, coding sequences used, classifications of types of interference, and criteria levels used for classification of a carrier as a cell/sector boundary carrier, and criteria used for initiating an intercarrier handoff.

Communications routines 916, include various communications applications which may be used to provide particular services, e.g., IP telephony services or interactive gaming, to one or more end node users. Signal generation/reception routines 918 utilize the data/info 914, e.g, data 928, system parameter information 932 such as hopping sequence values, user device info 926 such as device ID, carrier information 930 such as the current active carrier to provide the required signal timing control, synchronization, and signal generation and signal reception. The signal generation/reception routine 918 controls the transmission and the reception of payload data, e.g., a channel or time slot dedicated to the end node 900 for signaling purposes. Routine 918 may also control the operation of receiver 902 and the transmitter 904 including the setting of the programmable analog filters to the selected carrier frequencies.

Transmission power control and power control signaling routine 950 is used to control the generation, processing and reception of transmission power control signals. Module 950 controls the signaling used to implement transmission power control through interaction with the base station 800. Signals transmitted to, or received from the base station 800 are used to control end node 900 transmission power levels under direction of module 950. Power control is used by the base station 800 and the end nodes 900 to regulate power output when transmitting signals. The base station 800 transmits signals to the end nodes 900 which are used by the end nodes 900 in adjusting their transmission power output. The optimal level of power used to transmit signals varies with several factors including transmission burst rate, channel conditions and distance from the base station 800, e.g., the closer the end node 900 is to the base station 800, the less power the mobile node 900 needs to use to transmit signals to the base station 800. Using a maximum power output for all transmissions has disadvantages, e.g., the end node 900 battery life is reduced, and high power output increases the potential of the transmitted signals causing interference, e.g., with transmissions in neighboring or overlapping cells and or sectors. Transmission power control signaling allows the end node 900 to reduce and/or minimize transmission output power and thereby extend battery life.

Carrier signal strength measuring routine 920, included in power routine 950, monitors the signal strengths, e.g. pilots, and/or quality for all the carriers received by the end node 900 periodically and/or repetitively and stores the information as part of the carrier information 930 to be used by the cell/sector boundary identification routine 922 and the carrier selection routine 924 in accordance with the invention. Routine 920 may use the user/device info 926, e.g. state, to determine when to switch the receiver 902 to search for alternative carriers. Routine 920 may also control the switching within the receiver 902 between different programmable filters values for different carrier frequencies as the receiver 902 searches for all carriers. In accordance, with the invention, the carrier signal strength monitoring routine 920 is performed by end node 900 in a proactive manner; this allows transitions between carriers as the level of interference increases or the signal strength begins to degrade allowing the end node 900 to transition to a new carrier with minimal or no disruption in communications.

The cell boundary/sector boundary identification routine 922 identifies cell and sector boundary carriers utilizing, e.g., the carrier strength measurement information collected and applying rejection criteria defined in the system parameter info 932. The cell/sector boundary identification routine 922 estimates intercell channel interference due to transmissions from the base stations. The cell/sector boundary identification routine 922 estimates intersector channel interference due to transmissions from various sector of the same base station. Routine 924 generates a list of candidate carriers (part of carrier info 930) by applying an acceptable criteria, e.g., a signal strength criteria (part of system parameter info 932), to the list of measured carriers excluding identified cell/sector boundary carriers.

Carrier signal strength routine 920 and cell/boundary identification routine 922 may allow wireless terminal 900 to distinguish between intracell interference and other types of interference. Routines 920 and 922 may also allow wireless terminal 900 to distinguish between intersector interference and other types of interference.

Carrier selection routine 924 utilizes the list of candidate carriers to select a carrier for the end node 900 to use. The carrier selection routine 924 may apply additional criteria, such as system traffic loading, power considerations, anticipated entry into a sector/cell boundary region to select which carrier to use.

The present invention may be implemented in hardware, software, or a combination of hardware and software. For example, some aspects of the invention may be implemented as processor executed program instructions. Alternately, or in addition, some aspects of the present invention may be implemented as integrated circuits, such as, for example, ASICs.

Numerous additional variations on the methods and apparatus of the present invention described above will be apparent to those skilled in the art in view of the above descriptions of the invention. Such variations are to be considered within the scope of the invention.

What is claimed is:

1. A method of a wireless terminal, comprising:
   communicating with a base station using a first carrier provided within a first coverage area of the base station;
   determining that the wireless terminal is in a boundary region for the first carrier that is non-overlapping with a boundary region for another carrier provided by the base station, the first carrier being subject to inter-cell interference or inter-sector interference greater than a threshold within the boundary region, and that the first carrier is a boundary carrier, the boundary carrier being a carrier provided at the boundary region that corresponds to a first overlapping area between at least two sectors within a cell of the base station or a second overlapping area between the cell of the base station and a neighboring cell of a neighbor base station, and the first overlapping area being associated with the inter-sector interference and the second overlapping area being associated with the inter-cell interference;
   determining at least one candidate carrier provided by the base station that is a non-boundary carrier, the at least one candidate carrier excluding the first carrier and including a second carrier provided within a second coverage area of the base station; and
   initiating a handoff from the first carrier to the second carrier.

2. The method of claim 1, wherein the first carrier is subject to inter-cell interference greater than a threshold, the inter-cell interference within the boundary region is due to the first carrier being utilized by the neighboring cell of the neighboring base station, the first carrier is provided by the base station at a first power and the second carrier is provided by the base station at a second power greater than the first power, the first coverage area is within the second coverage area, the communicating and the initiating occur within the first coverage area, and the handoff is an intra-cell handoff to the second carrier provided by the base station.

3. The method of claim 1, wherein the first carrier is subject to inter-cell interference greater than a threshold, the inter-cell interference within the boundary region is due to the first carrier being utilized by the neighboring cell of the neighboring base station, the first carrier is provided by the base station at a first power and the second carrier is provided by the base station at a second power less than the first power, the second coverage area is within the first coverage area, the communicating and the initiating occur within the first coverage area and outside the second coverage area, and the handoff is an inter-cell handoff to the second carrier provided by the neighboring base station.

4. The method of claim 1, wherein the first carrier is subject to inter-sector interference greater than the threshold, the inter-sector interference within the boundary region is due to the first carrier being utilized by neighboring sectors of the base station, the first carrier is provided by the base station at a first power and the second carrier is provided by the base station at a second power greater than the first power, the first coverage area is within the second coverage area, the communicating and the initiating occur within the first coverage area, and the handoff is an intra-cell handoff to the second carrier provided by the base station.

5. The method of claim 1, wherein the first carrier is subject to inter-sector interference greater than the threshold, the inter-sector interference within the boundary region is due to the first carrier being utilized by neighboring sectors of the base station, the first carrier is provided by the base station at a first power and the second carrier is provided by the base station at a second power less than the first power, the second coverage area is within the first coverage area, the communicating and the initiating occur within the second coverage area, and the handoff is an intra-cell handoff to the second carrier provided by the base station.

6. The method of claim 1, wherein determining that the wireless terminal is in a boundary region for the first carrier comprises determining that a signal strength difference of the first carrier, measured by the wireless terminal, between the at least two sectors within the cell of the base station or between the cell of the base station and the neighboring cell of the neighbor base station is less than the predetermined value.

7. The method of claim 6, further comprising measuring a pilot tone strength difference between the at least two sectors within the cell of the base station or between the cell of the base station and the neighboring cell of the neighbor base station, wherein the signal strength difference is the measured pilot tone strength difference.

8. The method of claim 6, wherein the predetermined value is a signal strength difference of 20% or less.

9. The method of claim 6, wherein the predetermined value is a signal strength difference of 1 dB, 2 dB, 4 dB, 5 dB, or 6 dB.

10. The method of claim 1, wherein determining that the wireless terminal is in a boundary region for the first carrier comprises detecting, by the wireless terminal, a decrease in signal-to-noise ratio (SNR) of the first carrier to less than an upper threshold but still greater than a lower threshold.

11. The method of claim 10, wherein the upper threshold is 3 dB and the lower threshold is 0 dB.

12. A wireless terminal, comprising:
means for communicating with a base station using a first carrier provided within a first coverage area of the base station;
means for determining that the wireless terminal is in a boundary region for the first carrier that is non-overlapping with a boundary region for another carrier provided by the base station, the first carrier being subject to inter-cell interference or inter-sector interference greater than a threshold within the boundary region, and that the first carrier is a boundary carrier, the boundary carrier being a carrier provided at the boundary region that corresponds to a first overlapping area between at least two sectors within a cell of the base station or a second overlapping area between the cell of the base station and a neighboring cell of a neighbor base station, and the first overlapping area being associated with the inter-sector interference and the second overlapping area being associated with the inter-cell interference;
means for determining at least one candidate carrier provided by the base station that is a non-boundary carrier, the at least one candidate carrier excluding the first carrier and including a second carrier provided within a second coverage area of the base station; and
means for initiating a handoff from the first carrier to the second carrier.

13. The wireless terminal of claim 12, wherein the first carrier is subject to inter-cell interference greater than a threshold, the inter-cell interference within the boundary region is due to the first carrier being utilized by the neighboring cell of the neighboring base station, the first carrier is provided by the base station at a first power and the second carrier is provided by the base station at a second power greater than the first power, the first coverage area is within the second coverage area, the means for communicating communicates with the base station and the means for initiating initiates the handoff within the first coverage area, and the handoff is an intra-cell handoff to the second carrier provided by the base station.

14. The wireless terminal of claim 12, wherein the first carrier is subject to inter-cell interference greater than a threshold, the inter-cell interference within the boundary region is due to the first carrier being utilized by the neighboring cell of the neighboring base station, the first carrier is provided by the base station at a first power and the second carrier is provided by the base station at a second power less than the first power, the second coverage area is within the first coverage area, the means for communicating communicates with the base station and the means for initiating initiates the handoff within the first coverage area and outside the second coverage area, and the handoff is an inter-cell handoff to the second carrier provided by the neighboring base station.

15. The wireless terminal of claim 12, wherein the first carrier is subject to inter-sector interference greater than the threshold, the inter-sector interference within the boundary region is due to the first carrier being utilized by neighboring sectors of the base station, the first carrier is provided by the base station at a first power and the second carrier is provided by the base station at a second power greater than the first power, the first coverage area is within the second coverage area, the means for communicating communicates with the base station and the means for initiating initiates the handoff within the first coverage area, and the handoff is an intra-cell handoff to the second carrier provided by the base station.

16. The wireless terminal of claim 12, wherein the first carrier is subject to inter-sector interference greater than the threshold, the inter-sector interference within the boundary region is due to the first carrier being utilized by neighboring sectors of the base station, the first carrier is provided by the base station at a first power and the second carrier is provided by the base station at a second power less than the first power, the second coverage area is within the first coverage area, the means for communicating communicates with the base station and the means for initiating initiates the handoff within the second coverage area, and the handoff is an intra-cell handoff to the second carrier provided by the base station.

17. A wireless terminal, comprising:
a processor configured to:
communicate with a base station using a first carrier provided within a first coverage area of the base station;
determine that the wireless terminal is in a boundary region for the first carrier that is non-overlapping with a boundary region for another carrier provided by the base station, the first carrier being subject to inter-cell interference or inter-sector interference greater than a threshold within the boundary region, and that the first carrier is a boundary carrier, the boundary carrier being a carrier provided at the boundary region that corresponds to a first overlapping area between at least two sectors within a cell of the base station or a second overlapping area between the cell of the base station and a neighboring cell of a neighbor base station, and the first overlapping area being associated with the inter-sector interference and the second overlapping area being associated with the inter-cell interference;
determine at least one candidate carrier provided by the base station that is a non-boundary carrier, the at least one candidate carrier excluding the first carrier and including a second carrier provided within a second coverage area of the base station; and
initiate a handoff from the first carrier to the second carrier; and
a memory operably connected to said processor.

18. The wireless terminal of claim 17, wherein the first carrier is subject to inter-cell interference greater than a threshold, the inter-cell interference within the boundary region is due to the first carrier being utilized by the neighboring cell of the neighboring base station, the first carrier is provided by the base station at a first power and the second carrier is provided by the base station at a second power greater than the first power, the first coverage area is within the second coverage area, the processor is configured to communicate with the base station and to initiate the handoff within the first coverage area, and the handoff is an intra-cell handoff to the second carrier provided by the base station.

19. The wireless terminal of claim 17, wherein the first carrier is subject to inter-cell interference greater than a threshold, the inter-cell interference within the boundary region is due to the first carrier being utilized by the neighboring cell of the neighboring base station, the first carrier is provided by the base station at a first power and the second carrier is provided by the base station at a second power less than the first power, the second coverage area is within the first coverage area, the processor is configured to communicate with the base station and to initiate the handoff within the first coverage area and outside the second coverage area, and the handoff is an inter-cell handoff to the second carrier provided by the neighboring base station.

20. The wireless terminal of claim 17, wherein the first carrier is subject to inter-sector interference greater than the threshold, the inter-sector interference within the boundary region is due to the first carrier being utilized by neighboring sectors of the base station, the first carrier is provided by the base station at a first power and the second carrier is provided by the base station at a second power greater than the first power, the first coverage area is within the second coverage area, the processor is configured to communicate with the base station and to initiate the handoff within the first coverage area, and the handoff is an intra-cell handoff to the second carrier provided by the base station.

21. The wireless terminal of claim 17, wherein the first carrier is subject to inter-sector interference greater than the threshold, the inter-sector interference within the boundary region is due to the first carrier being utilized by neighboring sectors of the base station, the first carrier is provided by the base station at a first power and the second carrier is provided by the base station at a second power less than the first power, the second coverage area is within the first coverage area, the processor is configured to communicate with the base station and to initiate the handoff within the second coverage area, and the handoff is an intra-cell handoff to the second carrier provided by the base station.

22. A
a non-transitory computer-readable medium comprising code for:
communicating with a base station using a first carrier provided within a first coverage area of the base station;
determining that the wireless terminal is in a boundary region for the first carrier that is non-overlapping with a boundary region for another carrier provided by the base station, the first carrier being subject to inter-cell interference or inter-sector interference greater than a threshold within the boundary region, and that the first carrier is a boundary carrier, the boundary carrier being a carrier provided at the boundary region that corresponds to a first overlapping area between at least two sectors within a cell of the base station or a second overlapping area between the cell of the base station and a neighboring cell of a neighbor base station;
determining at least one candidate carrier provided by the base station that is a non-boundary carrier, the at least one candidate carrier excluding the first carrier and including a second carrier provided within a second coverage area; and
initiating a handoff from the first carrier to the second carrier.

23. The computer-readable medium of claim 22, wherein the first carrier is subject to inter-cell interference greater than a threshold, the inter-cell interference within the boundary region is due to the first carrier being utilized by the neighboring cell of the neighboring base station, the first carrier is provided by the base station at a first power and the second carrier is provided by the base station at a second power greater than the first power, the first coverage area is within the second coverage area, the code for communicating communicates with the base station and the code for initiating initiates the handoff within the first coverage area, and the handoff is an intra-cell handoff to the second carrier provided by the base station.

24. The computer-readable medium of claim 22, wherein the first carrier is subject to inter-cell interference greater than a threshold, the inter-cell interference within the boundary region is due to the first carrier being utilized by the neighboring cell of the neighboring base station, the first carrier is provided by the base station at a first power and the second carrier is provided by the base station at a second power less than the first power, the second coverage area is within the first coverage area, the code for communicating communicates with the base station and the code for initiating initiates the handoff within the first coverage area and outside the second coverage area, and the handoff is an inter-cell handoff to the second carrier provided by the neighboring base station.

25. The computer-readable medium of claim 22, wherein the first carrier is subject to inter-sector interference greater than the threshold, the inter-sector interference within the boundary region is due to the first carrier being utilized by neighboring sectors of the base station, the first carrier is provided by the base station at a first power and the second carrier is provided by the base station at a second power greater than the first power, the first coverage area is within the second coverage area, the code for communicating communicates with the base station and the code for initiating initiates the handoff within the first coverage area, and the handoff is an intra-cell handoff to the second carrier provided by the base station.

26. The computer-readable medium of claim 22, wherein the first carrier is subject to inter-sector interference greater than the threshold, the inter-sector interference within the boundary region is due to the first carrier being utilized by neighboring sectors of the base station, the first carrier is provided by the base station at a first power and the second carrier is provided by the base station at a second power less than the first power, the second coverage area is within the first coverage area, the code for communicating communicates with the base station and the code for initiating initiates the handoff within the second coverage area, and the handoff is an intra-cell handoff to the second carrier provided by the base station.

* * * * *